US011288521B2

(12) United States Patent
Vig

(10) Patent No.: US 11,288,521 B2
(45) Date of Patent: Mar. 29, 2022

(54) AUTOMATED ROAD EDGE BOUNDARY DETECTION

(71) Applicant: UATC, LLC, San Francisco, CA (US)

(72) Inventor: Sean David Vig, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 258 days.

(21) Appl. No.: 16/731,816

(22) Filed: Dec. 31, 2019

(65) Prior Publication Data

US 2020/0250439 A1    Aug. 6, 2020

Related U.S. Application Data

(60) Provisional application No. 62/799,154, filed on Jan. 31, 2019.

(51) Int. Cl.
*G06K 9/00* (2006.01)
*G05D 1/02* (2020.01)

(52) U.S. Cl.
CPC ....... *G06K 9/00798* (2013.01); *G05D 1/0219* (2013.01); *G05D 1/0221* (2013.01); *G05D 1/0246* (2013.01)

(58) Field of Classification Search
CPC ........... G06K 9/00798; G06K 9/00791; G05D 1/0219; G05D 1/0221; G05D 1/0246; G05D 1/0088; G05D 2291/0213; G01C 21/32
USPC ...................................................... 382/104
See application file for complete search history.

(56) References Cited

U.S. PATENT DOCUMENTS

| | | | | |
|---|---|---|---|---|
| 7,486,199 | B2 * | 2/2009 | Tengler | G08G 1/0965 |
| | | | | 340/436 |
| 10,162,355 | B2 * | 12/2018 | Hayon | G01C 21/3602 |
| 10,499,814 | B2 * | 12/2019 | Steinberg | A61B 6/469 |
| 2004/0078139 | A1 * | 4/2004 | Kornhauser | G01C 21/3415 |
| | | | | 701/428 |
| 2009/0295917 | A1 * | 12/2009 | Zhang | G08G 1/165 |
| | | | | 348/119 |
| 2010/0054538 | A1 * | 3/2010 | Boon | G06T 7/246 |
| | | | | 382/104 |
| 2013/0274959 | A1 * | 10/2013 | Igarashi | G08G 1/096861 |
| | | | | 701/1 |
| 2017/0008521 | A1 * | 1/2017 | Braunstein | G01C 21/165 |
| 2017/0113665 | A1 * | 4/2017 | Mudalige | G08G 1/166 |
| 2018/0003505 | A1 * | 1/2018 | Tateishi | G06T 7/70 |

(Continued)

FOREIGN PATENT DOCUMENTS

| | | | | |
|---|---|---|---|---|
| CN | 103971081 A | * | 8/2014 | G06K 9/4647 |
| CN | 107331186 A | * | 11/2017 | |
| JP | 2008276642 A | * | 11/2008 | |

*Primary Examiner* — Mahendra R Patel
(74) *Attorney, Agent, or Firm* — Schwegman Lundberg & Woessner, P.A.

(57) ABSTRACT

Systems, devices, products, apparatuses, and/or methods for generating a road edge boundary for an edge of a road in an AV map for controlling an autonomous vehicle on a roadway by obtaining map data associated with a map of a geographic location including a roadway associated with one or more locations of one or more vehicles in the roadway during one or more traversals of the roadway, determining one or more prediction scores based on the map data, including one or more predictions of whether the plurality of elements include road edge boundary locations, and generating in the map a road edge boundary based on the one or more prediction scores.

17 Claims, 9 Drawing Sheets

(56) References Cited

U.S. PATENT DOCUMENTS

| | | | |
|---|---|---|---|
| 2018/0074493 A1* | 3/2018 | Prokhorov | G05D 1/0274 |
| 2018/0188026 A1* | 7/2018 | Zhang | G06T 7/73 |
| 2018/0189578 A1* | 7/2018 | Yang | G06K 9/00798 |
| 2018/0196417 A1* | 7/2018 | Lagnemma | G05D 1/0027 |
| 2019/0019409 A1* | 1/2019 | Farr | G08G 1/0965 |
| 2019/0094858 A1* | 3/2019 | Radosavljevic | G08G 1/14 |
| 2019/0107838 A1* | 4/2019 | Sarkar | G05D 1/0088 |
| 2019/0145784 A1* | 5/2019 | Ma | G01C 21/32 |
| | | | 701/448 |
| 2019/0147372 A1* | 5/2019 | Luo | G06K 9/6272 |
| | | | 706/20 |
| 2019/0156129 A1* | 5/2019 | Kakegawa | G06K 9/00798 |

\* cited by examiner

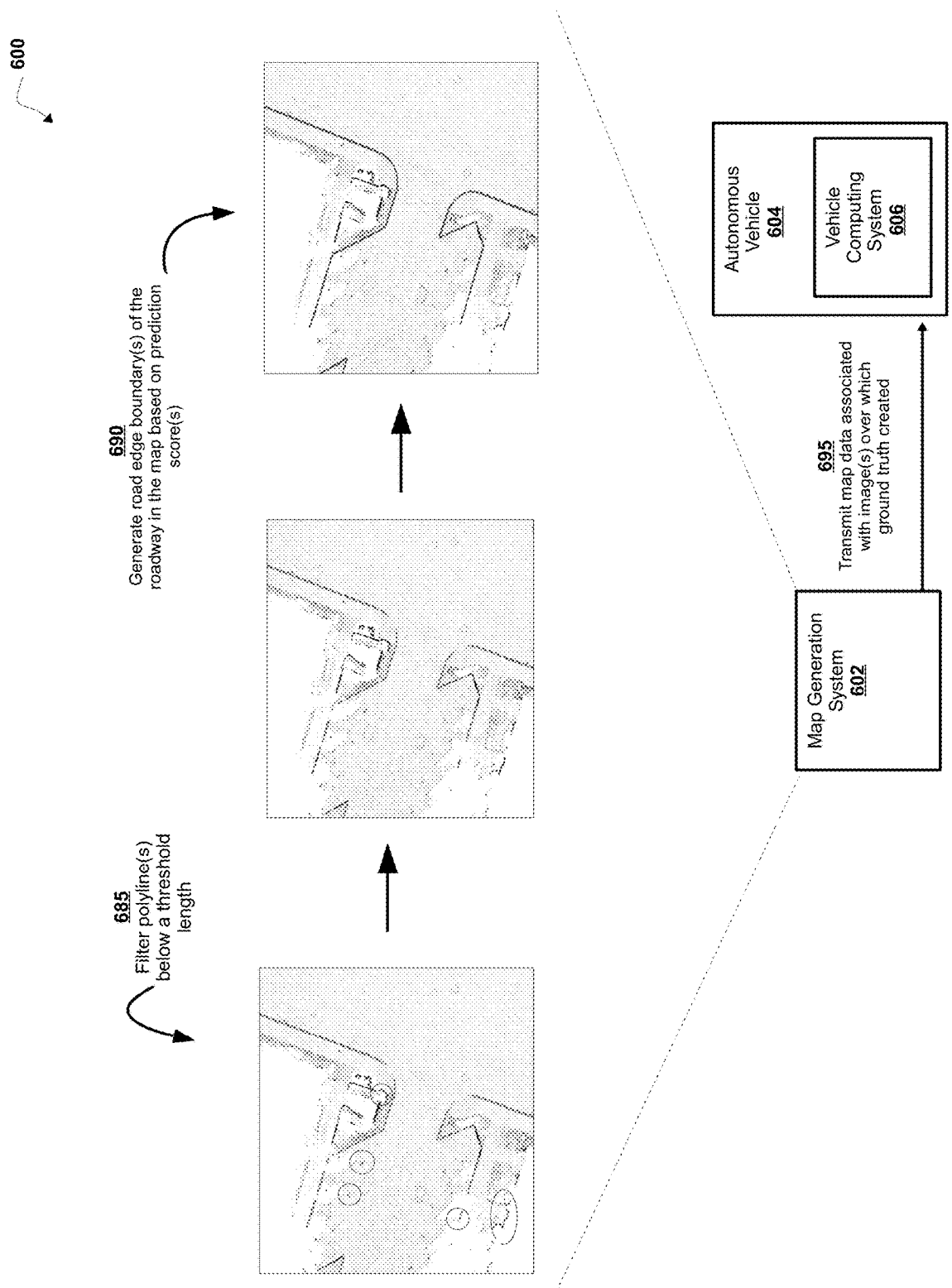

AUTOMATED ROAD EDGE BOUNDARY DETECTION

CROSS REFERENCE TO RELATED APPLICATIONS

This application claims the benefit of U.S. Provisional Application No. 62/799,154, filed Jan. 31, 2019, the entire disclosure of which is hereby incorporated by reference in its entirety.

BACKGROUND

An autonomous vehicle (e.g., a driverless car, a driverless automobile, a self-driving car, a robotic car, etc.) is a vehicle that is capable of sensing an environment of the vehicle and traveling (e.g., navigating, moving, etc.) in the environment without human input. An autonomous vehicle uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors to identify a route for traveling.

SUMMARY

Accordingly, disclosed are systems, devices, products, apparatuses, and/or methods for automated road edge boundary detection.

The features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

Provided are systems, devices, products, apparatuses, and/or methods for improving automated road edge boundary detection on a roadway of an autonomous vehicle, improving generation of an autonomous vehicle map to include locations of road edges, improving control of travel in a driving path of an autonomous vehicle based on automated road edge boundary detection, and/or the like.

Further, non-limiting aspects or embodiments are set forth in the following numbered clauses:

Clause 1: A computer-implemented method, comprising: obtaining, with a computer system comprising one or more processors, map data associated with a map of a geographic location including a roadway, wherein the map includes a plurality of elements, wherein the plurality of elements includes the map data, and wherein a first subset of elements of the plurality of elements is associated with one or more locations of one or more vehicles in the roadway during one or more traversals of the roadway by the one or more vehicles; determining, with the computing system, one or more prediction scores based on the map data, wherein the one or more prediction scores include one or more predictions of whether a second subset of elements of the plurality of elements include road edge boundary locations; and generating, with the computing system, in the map a road edge boundary for an edge of a road of the roadway based on the one or more prediction scores.

Clause 2: The computer-implemented method of clause 1, wherein generating the road edge boundary comprises: determining one or more elements of the plurality of elements that are lateral to a direction of travel of the one or more vehicles at the one or more locations; comparing the one or more pixel scores of the map data for the one or more elements to one or more threshold values; and determining a road edge boundary at a location of an element of the one or more elements based on the comparison.

Clause 3: The computer implemented method of any of clauses 1 or 2, wherein generating the road edge boundary comprises: connecting elements of the second subset of elements in a polyline based on the plurality of prediction scores and distances between the elements of the second subset of elements in the map.

Clause 4: The computer-implemented method of any of clauses 1-3, wherein the map data includes one or more images of the geographic location including the roadway, wherein the one or more images include one or more pixels corresponding to one or more elements of the plurality of elements of the map, and wherein the one or more pixels include at least one of the following parameters of the map data used to determine the one or more prediction scores: an angle, a LIDAR intensity value, a type of attribute of the roadway, an RGB value, or any combination thereof.

Clause 5: The computer-implemented method of any of clauses 1-4, wherein the map data includes a plurality of different images of the geographic location including the roadway, and wherein the plurality of different images include two or more of: a flatness image, a rasterized camera image, a LIDAR image, a rasterized pixel-wise semantic segmentation image, or any combination thereof.

Clause 6: The computer-implemented method of any of clauses 1-5, further comprising: obtaining, with the computing system, sensor data associated with one or more traversals of the roadway by the one or more vehicles; and generating, with the computing system, the one or more images based on the sensor data.

Clause 7: The computer-implemented method of any of clauses 1-6, further comprising: providing, with the computing system, the road edge boundary for controlling travel of an autonomous vehicle on the roadway.

Clause 8: A computing system, comprising: one or more processors programmed and/or configured to: obtain map data associated with a map of a geographic location including a roadway, wherein the map includes a plurality of elements, wherein the plurality of elements includes the map data, and wherein a first subset of elements of the plurality of elements is associated with one or more locations of one or more vehicles in the roadway during one or more traversals of the roadway by the one or more vehicles; determine one or more prediction scores based on the map data, wherein the one or more prediction scores include one or more predictions of whether a second subset of elements of the plurality of elements include road edge boundary locations; and generate in the map a road edge boundary for an edge of a road of the roadway based on the one or more prediction scores.

Clause 9: The computing system of clause 8, wherein the one or more processors are configured to generate in the map a road edge boundary for an edge of a road by: determining one or more elements of the plurality of elements that are lateral to a direction of travel of the one or more vehicles at the one or more locations; comparing the one or more pixel scores of the map data for the one or more elements to one or more threshold values; and determining a road edge boundary at a location of an element of the one or more elements based on the comparison.

Clause 10: The computing system of any of clauses 8 or 9, wherein the one or more processors are configured to generate the road edge boundary by: connecting elements of the second subset of elements in a polyline based on the plurality of prediction scores and distances between the elements of the second subset of elements in the map.

Clause 11: The computing system of any of clauses 8-10, wherein the map data includes one or more images of the geographic location including the roadway, wherein the one or more images include one or more pixels corresponding to one or more elements of the plurality of elements of the map, and wherein the one or more pixels include at least one of the following parameters of the map data used to determine the one or more prediction scores: an angle, a LIDAR intensity value, a type of attribute of the roadway, an RGB value, or any combination thereof.

Clause 12: The computing system of any of clauses 8-11, wherein the map data includes a plurality of different images of the geographic location including the roadway, and wherein the plurality of different images include two or more of: a flatness image, a rasterized camera image, a LIDAR image, a rasterized pixel-wise semantic segmentation image, or any combination thereof.

Clause 13: The computing system of any of clauses 8-12, wherein the one or more processors are further configured to: obtain sensor data associated with one or more traversals of the roadway by the one or more vehicles; and generate the one or more images based on the sensor data.

Clause 14: The computing system of any of clauses 8-13, wherein the one or more processors are further configured to: provide the road edge boundary for controlling travel of an autonomous vehicle on the roadway.

Clause 15: A computer program product comprising at least one non-transitory computer-readable medium including program instructions that, when executed by at least one processor, cause the at least one processor to: obtain map data associated with a map of a geographic location including a roadway, wherein the map includes a plurality of elements, wherein the plurality of elements includes the map data, and wherein a first subset of elements of the plurality of elements is associated with one or more locations of one or more vehicles in the roadway during one or more traversals of the roadway by the one or more vehicles; determine one or more prediction scores based on the map data, wherein the one or more prediction scores include one or more predictions of whether a second subset of elements of the plurality of elements include road edge boundary locations; and generate in the map a road edge boundary for an edge of a road of the roadway based on the one or more prediction scores.

Clause 16: The computer program product of clause 15, wherein the one or more instructions further cause the at least one processor to generate in the map a road edge boundary for an edge of a road by: determining one or more elements of the plurality of elements that are lateral to a direction of travel of the one or more vehicles at the one or more locations; comparing the one or more pixel scores of the map data for the one or more elements to one or more threshold values; and determining a road edge boundary at a location of an element of the one or more elements based on the comparison.

Clause 17: The computer program product of any of clauses 15 or 16, wherein the one or more instructions further cause the at least one processor to generate the road edge boundary by: connecting elements of the second subset of elements in a polyline based on the plurality of prediction scores and distances between the elements of the second subset of elements in the map.

Clause 18: The computer program product of any of clauses 15-17, wherein the map data includes one or more images of the geographic location including the roadway, wherein the one or more images include one or more pixels corresponding to one or more elements of the plurality of elements of the map, and wherein the one or more pixels include at least one of the following parameters of the map data used to determine the one or more prediction scores: an angle, a LIDAR intensity value, a type of attribute of the roadway, an RGB value, or any combination thereof.

Clause 19: The computer program product of any of clauses 15-18, wherein the map data includes a plurality of different images of the geographic location including the roadway, and wherein the plurality of different images include two or more of: a flatness image, a rasterized camera image, a LIDAR image, a rasterized pixel-wise semantic segmentation image, or any combination thereof.

Clause 20: The computer program product of any of clauses 15-19, wherein the one or more instructions further cause the at least one processor to: obtain sensor data associated with one or more traversals of the roadway by the one or more vehicles; and generate the one or more images based on the sensor data.

BRIEF DESCRIPTION OF THE DRAWINGS

FIGS. 6A-6D are diagrams of an implementation of one or more processes disclosed herein.

DETAILED DESCRIPTION

Figure 1:
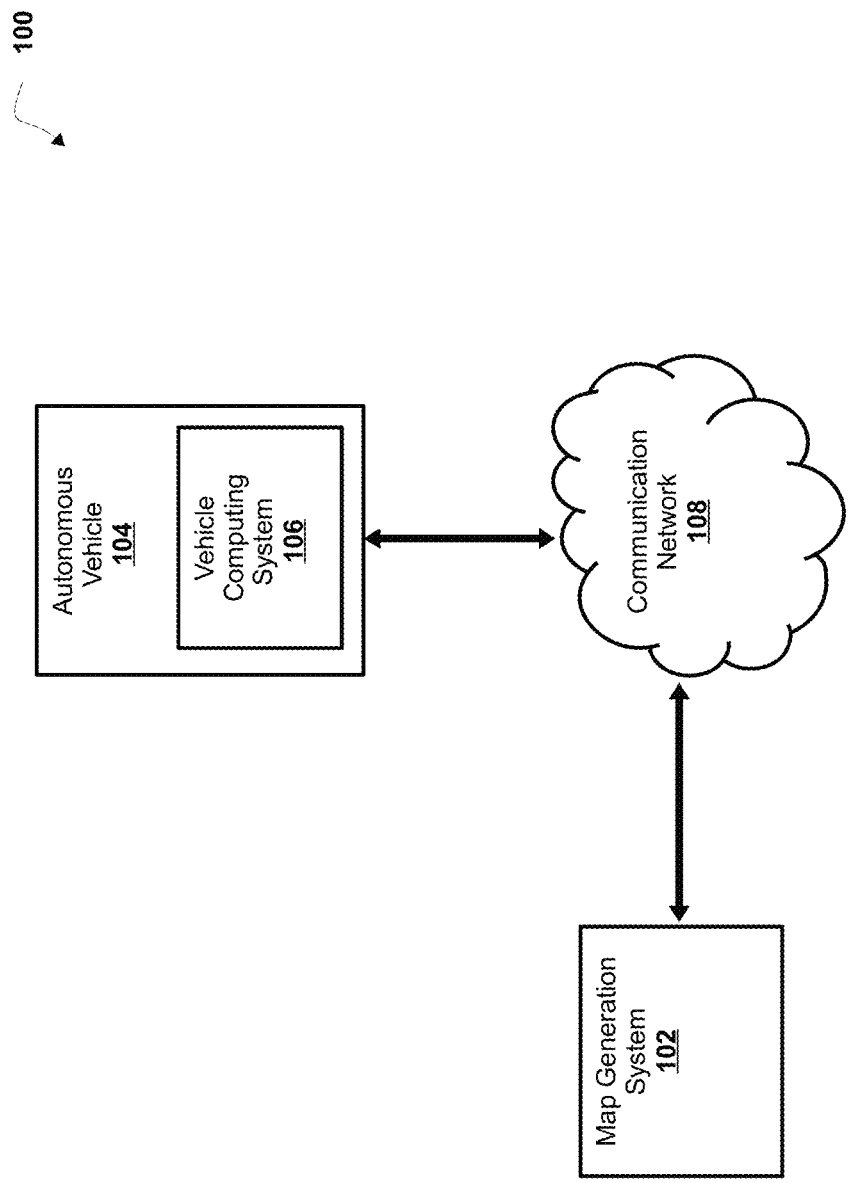
FIG. 1 is a diagram of non-limiting embodiments or aspects of an environment in which systems, devices, products, apparatuses, and/or methods, described herein, can be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like, are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices, such as an autonomous vehicle including a vehicle computing system, directly or indirectly communicating in the network environment may constitute a "system" or a "computing system".

It will be apparent that the systems and/or methods described herein can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

An autonomous vehicle (AV) map includes information associated with a roadway, such as an orientation and/or location of a roadway (e.g., a road, a road edge, etc.) relative to surroundings of the road (e.g., sidewalks, curbs, parking spaces, etc.). An AV may traverse a roadway, including one or more roads or intersections, based on an AV map including one or more road edges in a geographic location including the roadway. For safety and efficiency, an AV map includes precise information and/or labels for identifying and/or indicating a road edge (e.g., marking of a road edge, positioning of a road edge boundary, labeling of location parameters of a road edge, providing elevation information associated with a road edge, marking of a drivable surface boundary, etc.). Such identifying information, for example, enables the AV (e.g., a vehicle computing system of the AV, etc.) to use the AV map for determining vehicle maneuvers based on the shape or size of the roadway or intersection, and/or objects in the roadway (e.g., vehicles, pedestrians, parked cars, etc.) that have been detected in the geographic location of the roadway over which the AV travels.

In existing systems, roadways in an AV map are produced manually by a human operator identifying, drawing, and/or labeling road and intersection polygons (e.g., road polygons, intersection polygons, etc.) in a map of the geographic location. For example, in a manually produced AV map, roadways and intersections are hand-drawn and manually established by using data that has been collected to indicate a physically road edge. Road and intersection geometry are identified manually (e.g., by manually searching the map data to find road edges and/or by manually marking the road and intersection polygons in a geographic area).

However, such road and intersection polygons in the map data may be incomplete, inaccurate, and/or insufficient to determine the location of a road edge boundary. Also, road and intersection polygons can be difficult to locate manually and/or use a time intensive process requiring specialists (e.g., a specialist involved in the production of a map, etc.) to find and draw (e.g., label, annotate, position, orient, etc.) the polygons in a map. For example, specialists may examine an area of a map searching for indications (e.g., elevations, pixelwise segments, flatness images, etc.) in the map data associated with the area that may potentially represent a road or intersection, which presents a difficulty associated with parsing through many values and/or visually obscure representations of the area. After finding potential areas, manually identifying a road or intersection polygon may consume further time as a specialist judges if an area of the map includes characteristics that are both representative and sufficient to encode the road or intersection polygon into the map. Still further, by manually looking at maps and map images and viewing parameters and parameter changes in the AV map (e.g., changes in elevation, etc.), information may not be used that would further inform the precise location of the road or intersection. For example, when new features are discovered to encode into the map, such as new images, new types of map data, and/or new models, existing systems provide no integration point or means to evaluate the effects of the new features.

An aspect that makes AV maps particularly difficult to create (e.g., to draw, to generate, etc.) is the extent to which the AV map must accurately represent the position of a roadway in the map. An AV may not know (e.g., may not obtain information to determine, etc.) when and where a road edge ends relative to a roadway in a geographic location when an AV map includes manual designations of roadway and intersection polygons that inaccurately represent the roadway and/or may not determine with sufficient speed, accuracy, and/or precision (e.g., within a threshold distance, etc.) whether a surface boundary may cause or create a safety issue. Further, generating an AV map that includes manual designations of road and intersection polygons in a geographic location may consume a relatively large amount of highly skilled manual hours, and as such, an AV map that includes manual designations for each roadway or intersection in a geographic location may not be sufficiently generated based on a lack of network and/or processing resources to generate the AV map, a lack of time to generate the AV map, and/or a lack of data to generate the AV map. Still further, map data may be insufficient or deficient, such that a roadway or intersection may not be determined and/or determined accurately.

Non-limiting embodiments or aspects of the present disclosure are directed to systems, devices, products, apparatuses, and/or methods for automatically determining a road edge boundary based on location and/or pose data associated with one or more traversals of a roadway by one or more vehicles and/or providing road edge boundary information in an AV map for map production. For example, a method may include obtaining map data associated with a map of a geographic location including a roadway, the map including a plurality of elements, the plurality of elements including the map data, and a first subset of elements of the plurality of elements being associated with one or more locations of one or more vehicles in the roadway during one or more traversals of the roadway by the one or more vehicles; determining one or more prediction scores based on the map data, the one or more prediction scores including one or more predictions of whether a second subset of elements of the plurality of elements include road edge boundary locations; and generating a road edge boundary of the roadway in the map based on the plurality of prediction scores. In this way, rather than manually detecting road and intersection polygons in a map, automatically identified road edge boundaries that may be detected across a plurality of locations associated with a vehicle location and/or pose in a map can be connected together in a polyline associated with the road edge boundary to more effectively enable more accurate and more efficient road edge identification of a roadway of a geographic location, to provide improved coverage of the road edge boundaries for a roadway, and to provide more accurate boundary information and/or signals by which missing or improperly mapped roadways or intersections may be more easily determined, corrected, and/or adjusted in a map. Accordingly, time-intensive mapping of roadways and intersections (e.g., mapping of roadways with potentially obscured and/or hard to detect surface boundaries, etc.) may be reduced, navigation range and safety of AV travel may be enhanced, networking and processing time for generating AV maps may be reduced, and/or a time associated with human editing of an AV map (e.g., to label, to annotate, to position, to orient, etc.) may be reduced.

Referring now to FIG. 1, FIG. 1 is a diagram of an example environment 100 in which devices, systems, methods, and/or products described herein may be implemented. As shown in FIG. 1, environment 100 includes map generation system 102, autonomous vehicle 104, including vehicle computing system 106, and communication network 108. Systems and/or devices of environment 100 can interconnect via wired connections, wireless connections, or a combination of wired and wireless connections.

In some non-limiting embodiments or aspects, map generation system 102 includes one or more devices capable of obtaining map data associated with a map of a geographic location including a roadway, wherein the map includes a plurality of elements, wherein the plurality of elements includes the map data, and wherein a first subset of elements of the plurality of elements is associated with one or more locations of one or more vehicles in the roadway during one or more traversals of the roadway by the one or more vehicles, determining one or more prediction scores based on the map data, wherein the one or more prediction scores include one or more predictions of whether a second subset of elements of the plurality of elements include road edge boundary locations, and generating a road edge boundary (e.g., a spline, a polyline, etc.) of the roadway in the map based on the plurality of prediction scores. For example, map generation system 102 can include one or more computing systems including one or more processors (e.g., one or more servers, etc.).

In some non-limiting embodiments or aspects, map generation system 102 may generate a map layer (e.g., evidence layer, the road edge boundary layer, one or more detected road edge boundaries, etc.) to provide evidence to human operators for determining where road edge boundaries should be drawn in a map of a geographic location. Map generation system 102 may interact with web tools to assist the human in generating a motion path in the map. As an example, map generation system 102, in response to the human operator selecting a region, such as a region including an orientation, location, height and/or the like of a road edge boundary, can utilize the region which represents a road edge boundary to determine an area, position, and/or additional information for including a road edge boundary in the map. In such an example, inside of a road or intersection, the human operator might click the region, and map generation system 102 can use this as input to filter the signal and look only at the region of the road edge boundary to determine an area of the map associated with a road edge boundary. Map generation system 102 may suggest an orientation and location of a road edge boundary (e.g. polyline representing a road edge boundary, etc.) which the human can adjust if necessary, or map generation system 102 may return a region, and the human operator or the web tools, with the assistance of policy, may be able to determine the correct road edge boundary.

In some non-limiting embodiments or aspects, autonomous vehicle 104 (e.g., vehicle computing system 106, etc.) includes one or more devices capable of obtaining sensor data associated with a detected object in an environment surrounding autonomous vehicle 104. For example, autonomous vehicle 104 can include one or more computing systems including one or more processors (e.g., one or more servers, etc.) and one or more devices capable of obtaining sensor data (e.g., one or more wide angle cameras, LIDAR, RADAR, accelerometers, gyroscopes, etc.). As an example, autonomous vehicle 104 (e.g., vehicle computing system 106, etc.) includes one or more devices capable of obtaining sensor data associated with parameters in the roadway (e.g., z-value, pitch, pitch rate, longitudinal speed, longitudinal acceleration, yaw, yaw rate, latitudinal speed, latitudinal acceleration, x-values, y-values, roll, roll rate, etc.). Autonomous vehicle 104 may include one or more devices to determine the pose of the AV (e.g., positions, heading, and velocity, etc.) as it traverses a route in a geographic location. Autonomous vehicle 104 can determine (e.g., when traveling, etc.) roadway features (e.g., changes in elevation, such as hills, turns, and/or the like, etc.) and provide the determined or detected roadway features to map generation system 102 to factor into the map data associated with an environment surrounding autonomous vehicle 104 for controlling travel, operation, and/or routing of autonomous vehicle 104 based on map data, feature data, position data, state data, sensor data, motion data, test data, and/or the like.

In some non-limiting embodiments or aspects, map generation system 102 includes one or more devices capable of determining one or more prediction scores. For example, map generation system 102 determines a prediction score for determining a road edge boundary element from a plurality of elements in the roadway by comparing points along a ray projecting from a location associated with a vehicle pose of the autonomous vehicle 104 during collection of map data. The ray includes map points (e.g., pixels, groups of pixels, map areas, etc.) intersecting the ray extending outward from autonomous vehicle 104 through the edge of the roadway or intersection associated with the location. The prediction score identifies a road edge boundary point from the ray of points in a second subset of elements of the plurality of elements that includes a road edge boundary location. In some non-limiting embodiments or aspects, a plurality of points are determined based on a plurality of vehicle poses associated with autonomous vehicle 104.

In some non-limiting embodiments or aspects, map generation system 102 includes one or more devices capable of receiving, storing, and/or providing map data (e.g., map data, AV map data, coverage map data, hybrid map data, submap data, Uber's Hexagonal Hierarchical Spatial Index (H3) data, Google's S2 geometry data, etc.) associated with a map (e.g., a map, a submap, an AV map, a coverage map, a hybrid map, an H3 cell, an S2 cell, etc.) of a geographic location (e.g., a country, a state, a city, a portion of a city, a township, a portion of a township, etc.). For example, maps can be used for routing autonomous vehicle 104 on a roadway specified in the map.

In some non-limiting embodiments or aspects, a road refers to a paved or otherwise improved path between two places that allows for travel by a vehicle (e.g., autonomous vehicle 104, etc.). Additionally or alternatively, a road includes a roadway and a road edge boundary in proximity to (e.g., adjacent, near, next to, touching, etc.) the roadway. In some non-limiting embodiments or aspects, a roadway includes a portion of road on which a vehicle is intended to travel and is not restricted by a physical barrier or a separation so that the vehicle is able to travel laterally until reaching a road edge boundary. Additionally or alternatively, a roadway includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments or aspects, the one or more lanes include a roadway and one or more road edge boundaries. In some non-limiting embodiments or aspects, a roadway is connected to another roadway, for example, a lane of a roadway is connected to another lane of the roadway and/or a lane of the roadway is connected to a lane of another roadway.

In some non-limiting embodiments or aspects, a roadway is associated with map data that defines one or more attributes of (e.g., metadata associated with) the roadway (e.g., attributes of a roadway in a geographic location, attributes of a segment of a roadway, attributes of a lane of a roadway, attributes of an edge of a roadway, attributes of a motion path of a roadway, etc.). In some non-limiting embodiments or aspects, an attribute of a roadway includes an edge of a road (e.g., a location of an edge of a road, a distance of location from an edge of a road, an indication whether a location is within an edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), a centerline of a roadway (e.g., an indication of a centerline path in at least one lane of the roadway for controlling autonomous vehicle 104 during operation (e.g., following, traveling, traversing, routing, etc.) on a motion path, a motion path of a roadway (e.g., one or more trajectories that autonomous vehicle 104 can traverse in the roadway and an indication of the location of at least one feature in the roadway a lateral distance from the motion path, etc.), one or more objects (e.g., a vehicle, a speed bump, an edge of a road, a traffic face, vegetation, a pedestrian, a structure, a building, a sign, a lamppost, signage, a traffic sign, a bicycle, a railway track, a hazardous object, etc.) in proximity to and/or within a road (e.g., objects in proximity to the edges of a road and/or within the edges of a road), a sidewalk of a road, and/or the like. In some non-limiting embodiments or aspects, a map of a geographic location includes one or more routes that include one or more roadways. In some non-limiting embodiments or aspects, map data associated with a map of the geographic location associates each roadway of the one or more roadways with an indication of whether an autonomous vehicle 104 can travel on that roadway.

In some non-limiting embodiments or aspects, a motion path includes one or more trajectories for autonomous vehicle 104 on a roadway. For example, a motion path may include feature data associated with features of the roadway (e.g., a section of a road edge boundary, a marker, an object, etc.) for controlling autonomous vehicle 104 to autonomously determine objects in the roadway and/or feature data associated with longitudinal regions (e.g., a lane extending from the front or back edge of an AV, etc.) and with lateral regions (e.g., left and right road edge boundaries of a road in the roadway, etc.) of the motion path. As an example, a motion path includes a trajectory (e.g., a spline, a polyline, etc.), and a location of features (e.g., a portion of the feature, a section of the feature) in the roadway, with a link for transitioning between an entry point and an end point of the motion path based on at least one of heading information, curvature information, vehicle pose, acceleration information and/or the like, and intersections with features in the roadway (e.g., real objects, paint markers, curbs, other lane paths) of a lateral region (e.g., polygon) projecting from the path, with objects of interest. Further details regarding non-limiting embodiments of autonomous vehicle 104 are provided below with regard to FIG. 2.

In some non-limiting embodiments or aspects, communication network 108 includes one or more wired and/or wireless networks. For example, communication network 108 includes a cellular network (e.g., a long-term evolution (LTE) network, a third generation (3G) network, a fourth generation (4G) network, a fifth generation (5G), a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices and/or networks, fewer systems, devices, and/or networks, different systems, devices, and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100.

Figure 2:
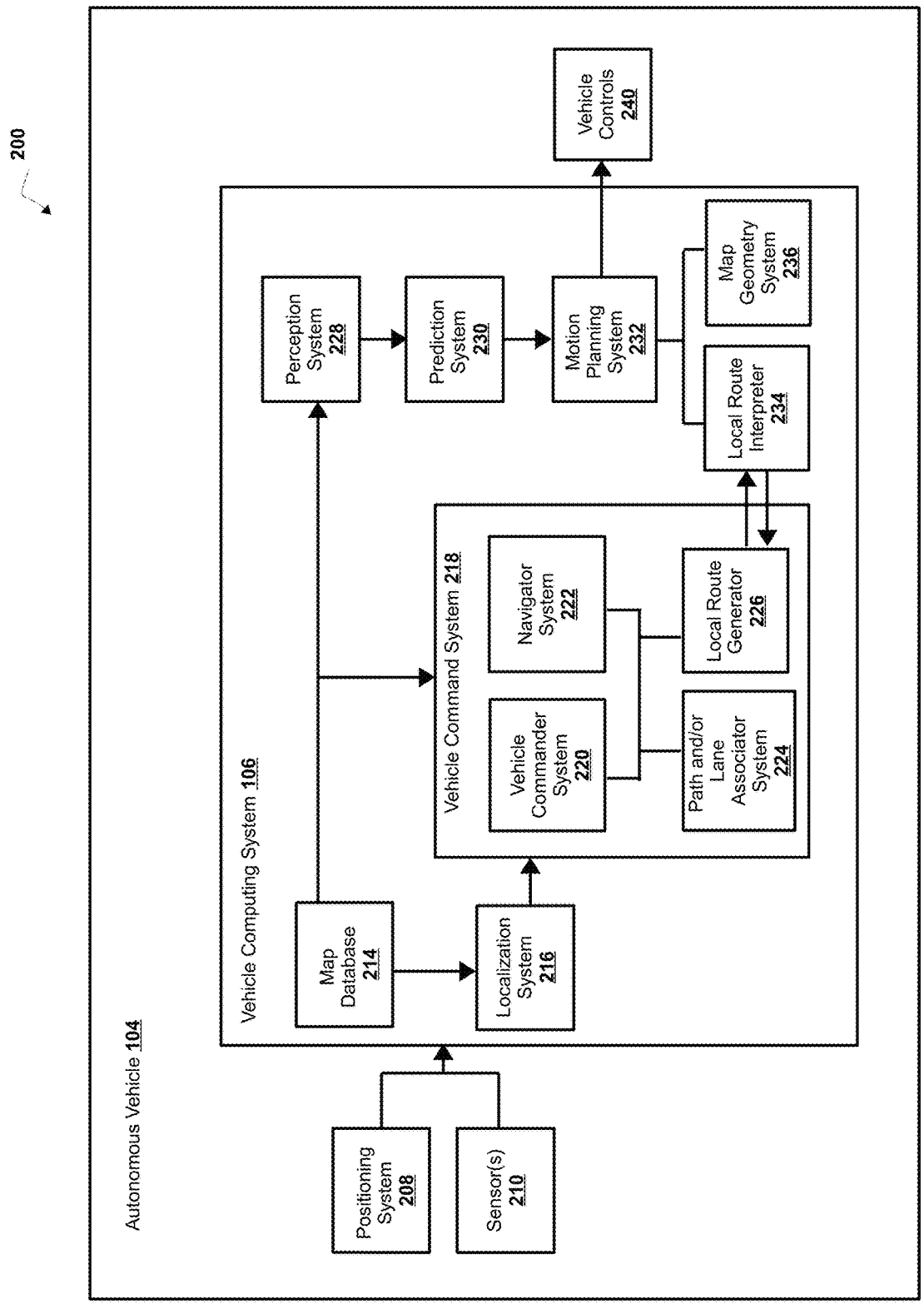
FIG. 2 is a diagram of non-limiting embodiments or aspects of a system for controlling an autonomous vehicle shown in FIG. 1.

Referring now to FIG. 2, FIG. 2 is a diagram of a non-limiting embodiment or aspect of a system 200 for controlling autonomous vehicle 104. As shown in FIG. 2, vehicle computing system 106 includes vehicle command system 218, perception system 228, prediction system 230, motion planning system 232, local route interpreter 234, and map geometry system 236 that cooperate to perceive a surrounding environment of autonomous vehicle 104, determine a motion plan of autonomous vehicle 104 based on the perceived surrounding environment, and control the motion (e.g., the direction of travel) of autonomous vehicle 104 based on the motion plan.

In some non-limiting embodiments or aspects, vehicle computing system 106 is connected to or includes positioning system 208. In some non-limiting embodiments or aspects, positioning system 208 determines a position (e.g., a current position, a past position, etc.) of autonomous vehicle 104. In some non-limiting embodiments or aspects, positioning system 208 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. In some non-limiting embodiments or aspects, the position of autonomous vehicle 104 is used by vehicle computing system 106.

In some non-limiting embodiments or aspects, vehicle computing system 106 receives sensor data from one or more sensors 210 that are coupled to or otherwise included in autonomous vehicle 104. For example, one or more sensors 210 includes a Light Detection and Ranging (LIDAR) system, a Radio Detection and Ranging (RADAR) system, one or more cameras (e.g., visible spectrum cameras, infrared cameras, etc.), and/or the like. In some non-limiting embodiments or aspects, the sensor data includes data that describes a location of objects within the surrounding environment of autonomous vehicle 104. In some non-limiting embodiments or aspects, one or more sensors 210 collect sensor data that includes data that describes a location (e.g., in 3-D space relative to autonomous vehicle 104) of points that correspond to objects within the surrounding environment of autonomous vehicle 104.

In some non-limiting embodiments or aspects, the sensor data includes a location (e.g., a location in 3-D space relative to the LIDAR system) of a number of points (e.g., a point cloud) that correspond to objects that have reflected a ranging laser. In some non-limiting embodiments or aspects, the LIDAR system measures distances by measuring a Time of Flight (TOF) that a short laser pulse takes to travel from a sensor of the LIDAR system to an object and back, and the LIDAR system calculates the distance of the object to the LIDAR system based on the known speed of light. In some non-limiting embodiments or aspects, map data includes LIDAR point cloud maps associated with a geographic location (e.g., a location in 3-D space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

In some non-limiting embodiments or aspects, the sensor data includes a location (e.g., a location in 3-D space relative to the RADAR system) of a number of points that correspond to objects that have reflected a ranging radio wave. In some non-limiting embodiments or aspects, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments or aspects, the RADAR system provides information about the location and/or the speed of an object relative to the RADAR system based on the radio waves.

In some non-limiting embodiments or aspects, image processing techniques (e.g., range imaging techniques, as an example, structure from motion, structured light, stereo triangulation, etc.) can be performed by system 200 to identify a location (e.g., in 3-D space relative to the one or more cameras) of a number of points that correspond to objects that are depicted in images captured by one or more cameras. Other sensors can identify the location of points that correspond to objects as well.

In some non-limiting embodiments or aspects, map database 214 provides detailed information associated with the map, features of the roadway in the geographic location, and information about the surrounding environment of autonomous vehicle 104 for autonomous vehicle 104 to use while driving (e.g., traversing a route, planning a route, determining a motion plan, controlling autonomous vehicle 104, etc.).

In some non-limiting embodiments or aspects, vehicle computing system 106 receives a vehicle pose from localization system 216 based on one or more sensors 210 that are coupled to or otherwise included in autonomous vehicle 104. In some non-limiting embodiments or aspects, localization system 216 includes a LIDAR localizer, a low quality pose localizer, and/or a pose filter. For example, the localization system 216 uses a pose filter that receives and/or determines one or more valid pose estimates (e.g., not based on invalid position data, etc.) from the LIDAR localizer and/or the low quality pose localizer, for determining a map-relative vehicle pose. For example, low quality pose localizer determines a low quality pose estimate in response to receiving position data from positioning system 208 for operating (e.g., routing, navigating, controlling, etc.) autonomous vehicle 104 under manual control (e.g., in a coverage lane, on a coverage motion path, etc.). In some non-limiting embodiments or aspects, LIDAR localizer determines a LIDAR pose estimate in response to receiving sensor data (e.g., LIDAR data, RADAR data, etc.) from sensors 210 for operating (e.g., routing, navigating, controlling, etc.) autonomous vehicle 104 under autonomous control (e.g., in an AV lane, on an AV motion path, etc.).

In some non-limiting embodiments or aspects, vehicle command system 218 includes vehicle commander system 220, navigator system 222, path and/or lane associator system 224, and local route generator 226, that cooperate to route and/or navigate autonomous vehicle 104 in a geographic location. In some non-limiting embodiments or aspects, vehicle commander system 220 provides tracking of a current objective of autonomous vehicle 104, such as, a current service, a target pose, a coverage plan (e.g., development testing, etc.), and/or the like. In some non-limiting embodiments or aspects, navigator system 222 determines and/or provides a route plan (e.g., a route between a starting location or a current location and a destination location, etc.) for autonomous vehicle 104 based on a current state of autonomous vehicle 104, map data (e.g., lane graph, motion paths, etc.), and one or more vehicle commands (e.g., a target pose). For example, navigator system 222 determines a route plan (e.g., a plan, a re-plan, a deviation from a route plan, etc.) including one or more lanes (e.g., current lane, future lane, etc.) and/or one or more motion paths (e.g., a current motion path, a future motion path, etc.) in one or more roadways that autonomous vehicle 104 can traverse on a route to a destination location (e.g., a target location, a trip drop-off location, etc.).

In some non-limiting embodiments or aspects, navigator system 222 determines a route plan based on one or more lanes and/or one or more motion paths received from path and/or lane associator system 224. In some non-limiting embodiments or aspects, path and/or lane associator system 224 determines one or more lanes and/or one or more motion paths of a route in response to receiving a vehicle pose from localization system 216. For example, path and/or lane associator system 224 determines, based on the vehicle pose, that autonomous vehicle 104 is on a coverage lane and/or a coverage motion path, and in response to determining that autonomous vehicle 104 is on the coverage lane and/or the coverage motion path, determines one or more candidate lanes (e.g., routable lanes, etc.) and/or one or more candidate motion paths (e.g., routable motion paths, etc.) within a distance of the vehicle pose associated with autonomous vehicle 104. For example, path and/or lane associator system 224 determines, based on the vehicle pose, that autonomous vehicle 104 is on an AV lane and/or an AV motion path, and in response to determining that autonomous vehicle 104 is on the AV lane and/or the AV motion path, determines one or more candidate lanes (e.g., routable lanes, etc.) and/or one or more candidate motion paths (e.g., routable motion paths, etc.) within a distance of the vehicle pose associated with autonomous vehicle 104. In some non-limiting embodiments or aspects, navigator system 222 generates a cost function for each of the one or more candidate lanes and/or the one or more candidate motion paths that autonomous vehicle 104 may traverse on a route to a destination location. For example, navigator system 222 generates a cost function that describes a cost (e.g., a cost over a time period) of following (e.g., adhering to) one or more lanes and/or one or more motion paths that may be used to reach the destination location (e.g., a target pose, etc.).

In some non-limiting embodiments or aspects, local route generator 226 generates and/or provides route options that may be processed and control travel of autonomous vehicle 104 on a local route. For example, navigator system 222 may configure a route plan, and local route generator 226 may generate and/or provide one or more local routes or route options for the route plan. For example, the route options may include one or more options for adapting the motion of the AV to one or more local routes in the route plan (e.g., one or more shorter routes within a global route between the current location of the AV and one or more exit locations located between the current location of the AV and the destination location of the AV, etc.). In some non-limiting embodiments or aspects, local route generator 226 may determine a number of route options based on a predetermined number, a current location of the AV, a current service of the AV, and/or the like.

In some non-limiting embodiments or aspects, perception system 228 detects and/or tracks objects (e.g., vehicles, pedestrians, bicycles, and/or the like) that are proximate to (e.g., in proximity to the surrounding environment of) autonomous vehicle 104 over a time period. In some non-limiting embodiments or aspects, perception system 228 can retrieve (e.g., obtain) map data from map database 214 that provides detailed information about the surrounding environment of autonomous vehicle 104.

In some non-limiting embodiments or aspects, perception system 228 determines one or more objects that are proximate to autonomous vehicle 104 based on sensor data received from one or more sensors 210 and/or map data from map database 214. For example, perception system 228 determines, for the one or more objects that are proximate, state data associated with a state of such an object. In some non-limiting embodiments or aspects, the state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape, such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

In some non-limiting embodiments or aspects, perception system 228 determines state data for an object over a number of iterations of determining state data. For example, perception system 228 updates the state data for each object of a plurality of objects during each iteration.

In some non-limiting embodiments or aspects, prediction system 230 receives the state data associated with one or more objects from perception system 228. Prediction system 230 predicts one or more future locations for the one or more objects based on the state data. For example, prediction system 230 predicts the future location of each object of a plurality of objects within a time period (e.g., 5 seconds, 10 seconds, 20 seconds, etc.). In some non-limiting embodiments or aspects, prediction system 230 predicts that an object will adhere to the object's direction of travel according to the speed of the object. In some non-limiting embodiments or aspects, prediction system 230 uses machine learning techniques or modeling techniques to make a prediction based on state data associated with an object.

In some non-limiting embodiments or aspects, motion planning system 232 determines a motion plan for autonomous vehicle 104 based on a prediction of a location associated with an object provided by prediction system 230 and/or based on state data associated with the object provided by perception system 228. For example, motion planning system 232 determines a motion plan (e.g., an optimized motion plan) for autonomous vehicle 104 that causes autonomous vehicle 104 to travel relative to the object based on the prediction of the location for the object provided by prediction system 230 and/or the state data associated with the object provided by perception system 228.

In some non-limiting embodiments or aspects, motion planning system 232 receives a route plan as a command from navigator system 222. In some non-limiting embodiments or aspects, motion planning system 232 determines a cost function for one or more motion plans of a route for autonomous vehicle 104 based on the locations and/or predicted locations of one or more objects. For example, motion planning system 232 determines the cost function that describes a cost (e.g., a cost over a time period) of following (e.g., adhering to) a motion plan (e.g., a selected motion plan, an optimized motion plan, etc.). In some non-limiting embodiments or aspects, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments or aspects, motion planning system 232 determines a cost of following a motion plan. For example, motion planning system 232 determines a motion plan for autonomous vehicle 104 based on one or more cost functions. In some non-limiting embodiments or aspects, motion planning system 232 determines a motion plan (e.g., a selected motion plan, an optimized motion plan, a preferred motion plan, etc.) that minimizes a cost function. In some non-limiting embodiments or aspects, motion planning system 232 provides a motion plan to vehicle controls 240 (e.g., a device that controls acceleration, a device that controls steering, a device that controls braking, an actuator that controls gas flow, etc.) to implement the motion plan.

In some non-limiting embodiments or aspects, motion planning system 232 communicates with local route interpreter 234 and map geometry system 236. In some non-limiting embodiments or aspects, local route interpreter 234 may receive and/or process route options from local route generator 226. For example, local route interpreter 234 may determine a new or updated route for travel of autonomous vehicle 104. As an example, one or more lanes and/or one or more motion paths in a local route may be determined by local route interpreter 234 and map geometry system 236. For example, local route interpreter 234 can determine a route option and map geometry system 236 determines one or more lanes and/or one or more motion paths in the route option for controlling motion of autonomous vehicle 104.

Figure 3:
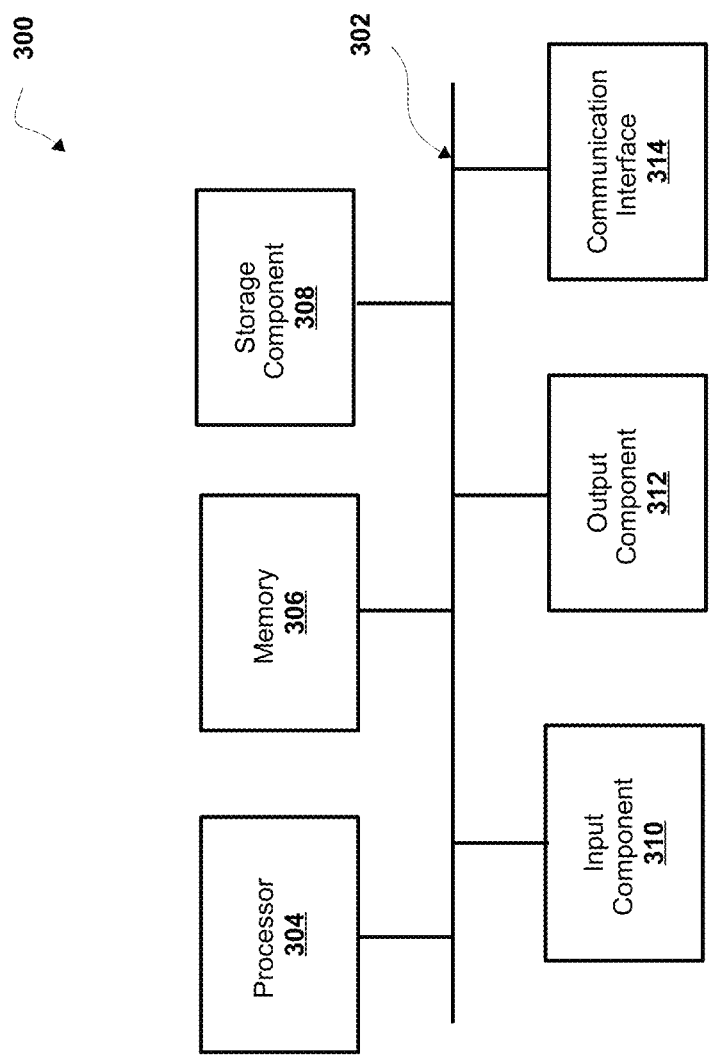
FIG. 3 is a diagram of non-limiting embodiments or aspects of components of one or more devices and/or one or more systems of FIGS. 1 and 2.

Referring now to FIG. 3, FIG. 3 is a diagram of example components of a device 300. Device 300 can correspond to one or more devices of map generation system 102 and/or one or more devices of (e.g., one or more devices of a system of) autonomous vehicle 104. In some non-limiting embodiments or aspects, one or more devices of map generation system 102 and/or one or more devices of (e.g., one or more devices of a system of) autonomous vehicle 104 can include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments or aspects, processor 304 is implemented in hardware, firmware, or a combination of hardware and firmware. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disc (e.g., a magnetic disc, an optical disc, a magneto-optic disc, a solid state disc, etc.), a compact disc (CD), a digital versatile disc (DVD), a floppy disc, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices. Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments or aspects, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
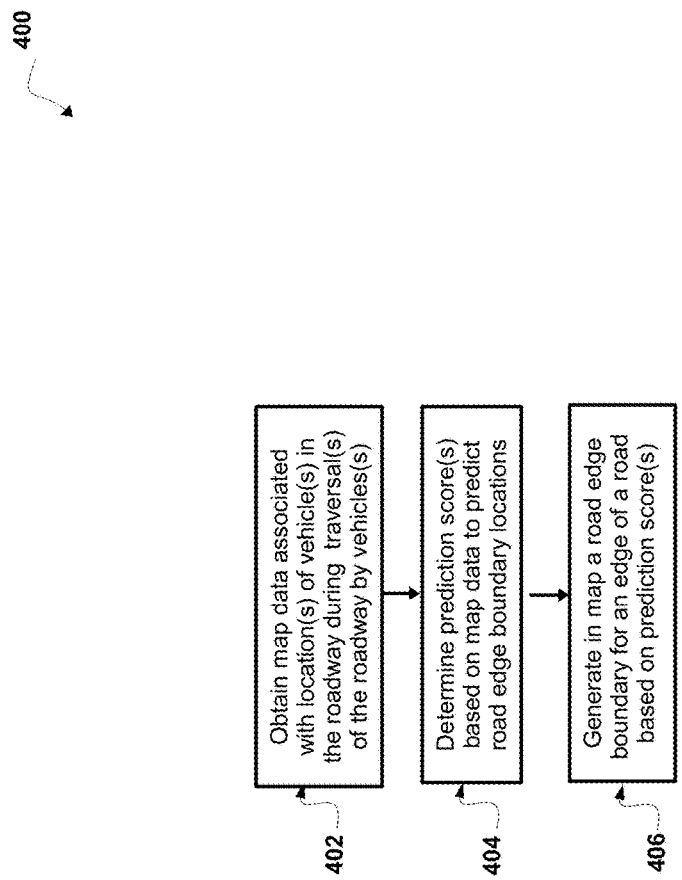
FIG. 4 is a flowchart of non-limiting embodiments or aspects of a process for determining a road edge boundary.

Referring now to FIG. 4, FIG. 4 is a flowchart of a non-limiting embodiment or aspect of a process 400 for determining a road edge boundary. In some non-limiting embodiments or aspects, one or more of the steps of process 400 are performed (e.g., completely, partially, etc.) by map generation system 102 (e.g., one or more devices of map generation system 102, etc.). In some non-limiting embodiments or aspects, one or more of the steps of process 400 are performed (e.g., completely, partially, etc.) by another device or a group of devices separate from or including map generation system 102, such as one or more devices of (e.g., one or more devices of a system of) autonomous vehicle 104.

As shown in FIG. 4, at step 402, process 400 includes obtaining map data associated with one or more locations of one or more vehicles in the roadway during one or more traversals of the roadway by the one or more vehicles. For example, map generation system 102 obtains map data associated with a map of a geographic location including a roadway, the map including a plurality of elements, the plurality of elements including the map data, and a first subset of elements of the plurality of elements is associated with one or more locations of one or more vehicles in the roadway during one or more traversals of the roadway by the one or more vehicles. As an example, map generation system 102 obtains (e.g., receives, retrieves, generates, etc.) map data received from autonomous vehicle 104.

In some non-limiting embodiments or aspects, map generation system 102 obtains map data that includes a plurality of elements (e.g., cells, pixels, matrices, etc.) associated with an image of a road (e.g., an image of a road in a geographic location; an image of a geographic location that includes one the road, such as a geographic location image; an image of the road that includes data associated with operating a vehicle on the road, such as a road map; an image of the road that includes features of the road, such as a feature map; an image of a lane of the road located in a map; etc.). In some non-limiting embodiments, map generation system 102 receives image data having a plurality of elements associated with an image and/or an image from an image database (e.g., a database that stores an image). For example, map generation system 102 receives the image data associated with the image and/or the image from an image database based on a request for a map and/or map data associated with a map (e.g., a request for an updated AV map and/or updated AV map data associated with an updated AV map) from autonomous vehicle 104.

In some non-limiting embodiments or aspects, the map data includes a plurality of elements associated with an image of a road that includes Light Detection and Ranging (LIDAR) image data associated with a LIDAR image of the road and/or Red Green Blue (RGB) image data (e.g., truecolor image data) associated with an RGB image of the road. In some non-limiting embodiments, the RGB image includes a plurality of elements associated with a top down image of the road. In some non-limiting embodiments, the plurality of elements includes black and white image data associated with a black and white image of the road.

In some non-limiting embodiments or aspects, the plurality of elements are associated with an image of a road and the road includes a lane of the road having a road edge boundary and an area beyond the road edge boundary (e.g., non-drivable surface, a sidewalk, a siding, a pullout, etc.). For example, the plurality of elements includes image data associated with an image of a geographic location (e.g., geographic location image data associated with an image of a geographic location) including one or more roads (e.g., one or more drivable surfaces, etc.), image data associated with a road map (e.g., road map image data associated with an image of a road map) including one or more roads, curb marking image data associated with an image of a curb marking of a curb of a road, lane marking image data associated with an image of a lane marking of a lane of a road, non-drivable surface image data associated with an image of a non-drivable surface associated with a road, and/or image data associated with a feature map (e.g., feature map data associated with a feature map) of features of a road. In some non-limiting embodiments or aspects, a lane marking includes a device and/or material on a road surface of a road to convey official information associated with operating a vehicle in a lane of the road.

In some non-limiting embodiments or aspects, the plurality of elements may include map data associated with a static object (e.g., a non-moving object, an object that is not capable of moving, etc.). For example, a static object may include road markings (e.g., yellow lines, crosswalks, etc.), a sign (e.g., a stop sign, etc.), a curb, a building, and/or the like.

In some non-limiting embodiments or aspects, the plurality of elements includes sensor data associated with one or more locations of one or more vehicles in the roadway. As an example, map generation system 102 obtains map data collected by autonomous vehicles and/or non-autonomous, human controlled vehicles as the vehicles traverse a roadway through one or more locations in a geographic region. For example, the sensor data may be collected by vehicles (e.g., map collection vehicle, etc.) during traversal of a first subset of elements of the plurality of elements specifically for collecting data for mapping and/or during normal (e.g., non-mapping specific, etc.) autonomy operations. As an example, when vehicles travel in the world, sensor(s) 210 can log sensor data (e.g., LIDAR point clouds, video logs from the cameras, etc.) in vehicle logs, and the sensor data in the vehicle logs can be collected, stored, and/or aggregated together by map generation system 102.

In some non-limiting embodiments or aspects, map generation system 102 may obtain map data collected by autonomous vehicle 104 including sensor data (e.g., one or more wide angle cameras, LIDAR, RADAR, accelerometers, gyroscopes, etc.). As an example, map generation system 102 may obtain sensor data associated with parameters in the roadway including a z-value, pitch, pitch rate, longitudinal speed, longitudinal acceleration, yaw, yaw rate, latitudinal speed, latitudinal acceleration, x-values, y-values, roll, roll rate, and/or the like.

In some non-limiting embodiments or aspects, map generation system 102 may obtain map data including a pose of an AV (e.g., positions, heading, and velocity, etc.) as it traverses a route in a geographic location. Autonomous vehicle 104 can also determine sensor data associated with one or more roadway features of a roadway such as changes in elevation, z-values, or other physical phenomena in an area surrounding autonomous vehicle 104 as it traverses a roadway and provides the determined or detected roadway features to map generation system 102 to factor into the map data associated with an environment surrounding autonomous vehicle 104.

In some non-limiting embodiments or aspects, the identified sensor data may be stored or processed as a chunk of sensor data (e.g., a plurality of chunks, a log, etc.) associated with a length of a roadway in the geographic region. Map generation system 102 may further divide the chunk of sensor data into one or more segments based on the length of roadway associated with the chunk. For example, the map generation system 102 generates one or more segments of sensor data associated with a predetermined area of the roadway (e.g., a 10 cm by 10 cm segment bounded by an x-value and y-value in a map, a segment of car-length distance (roughly 4.95 meters), etc.).

In some non-limiting embodiments or aspects, map generation system 102 generates or obtains one or more probability maps associated with a probability of the road edge boundary or some other attribute of a roadway corresponding to at least one area in the map. For example, map generation system 102 generates a segmentation in the probability map of the geographic location corresponding to a probability that the map area (e.g., pixel, cell, etc.) associated with the segmentation is a location of at least one attribute of a roadway. For example, map generation system 102 provides a segmentation by defining, classifying, and/or labeling one or more attributes of the roadway (e.g., attributes of a roadway in a geographic location, attributes of a segment of a roadway, attributes of a lane of a roadway, attributes of an edge of a roadway, attributes of a driving path of a roadway, etc.).

In some non-limiting embodiments or aspects, map generation system 102 defines, classifies, and/or labels each area (e.g., pixel, cell, etc.) of an attribute of a roadway including a road (e.g., a drivable surface, a non-drivable surface, etc.), a curb, a crosswalk, an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, an overlook, roadside pull-off, rest area, a siding lane, an emergency lane, a turning lane of a roadway, lane markings, a direction of travel in a lane of a roadway, etc.), a centerline of a roadway (e.g., an indication of a centerline path in at least one lane of the roadway for controlling autonomous vehicle 104 during operation (e.g., following, traveling, traversing, routing, etc.) on a driving path, a driving path of a roadway (e.g., one or more trajectories that autonomous vehicle 104 can traverse in the roadway and an indication of the location of at least one feature in the roadway a lateral distance from the driving path, etc.), one or more objects (e.g., a vehicle, vegetation, a pedestrian, a structure, a building, a sign post, a lamppost, signage, a traffic signal, a bicycle, a railway track, a hazardous object, etc.) in proximity to and/or within a road (e.g., objects in proximity to the road edges of a road and/or within the road edges of a road), a sidewalk of a road, and/or the like.

In some non-limiting embodiments or aspects, map generation system 102 may obtain or generate one or more probability maps including a heatmap (e.g., a two dimensional heatmap, a two dimensional heatmap of cloud points representing a feature of a road, a normalized heatmap, etc.) associated with an attribute and/or feature of a road in the geographic area. As an example, a heatmap may include a value (e.g., a number between 0-255, etc.) of a color of each element (e.g., a pixel, a cell, etc.) in an image of the geographic location. In some non-limiting embodiments or aspects, the value of the color may vary among shades of black, white, red, green, and/or blue to indicate a probability of an object (e.g., an intensity of a color (e.g., black, white, red, green, blue), etc.) in the image of the geographic location. In some non-limiting embodiments or aspects, map generation system 102 generates the heatmap having an intensity of the color associated with a homogenous area of a geographic location associated with a road. For example, map generation system 102 may generate a heatmap for a lane of a roadway (e.g., a parking lane, a travel lane, a road edge boundary, a ground surface, etc.) in the geographic location based on the intensity of the color being the same in the portion of the geographic location that includes the road edge boundary.

In some non-limiting embodiments or aspects, map generation system 102 may obtain or generate a map layer based on a top down camera image (e.g., a synthesized Red Green Blue (RGB) image) of a roadway including a road edge boundary in the geographic location. In some non-limiting embodiments or aspects, map generation system 102 obtains or generates a map of a roadway including a road edge boundary in a top down camera image based on identifying a roadway including a road edge boundary. For example, map generation system 102 may obtain a top down image of a roadway including a road edge boundary to overlay road edge boundary imagery in an area corresponding to the geographic location of a roadway.

As shown in FIG. 4, at step 404, process 400 includes determining one or more prediction scores based on map data to predict road edge boundary locations. As an example, map generation system 102 determines one or more prediction scores based on the map data, the one or more prediction scores including one or more predictions (e.g., signals, etc.) of whether a second subset of elements of the plurality of elements include road edge boundary locations. For example, map generation system 102 determines the one or more prediction scores using map data based on an observed or measured change in one or more parameters (e.g., an elevation, a height, a vehicle pose, etc.) of a roadway.

In some non-limiting embodiments, map generation system 102 generates one or more prediction scores of a road edge boundary classification associated with one or more elements (e.g., each element of a plurality of elements, a portion of elements of the plurality of elements, etc.) of a matrix of an image. For example, map generation system 102 generates a prediction score of a road edge boundary classification for each element of a plurality of elements of the matrix of the image.

In some non-limiting embodiments or aspects, map generation system 102 determines the one or more predictions scores based on the map data (e.g., the plurality of elements, etc.) of a map. For example, the one or more prediction scores may be associated with an area of the map (e.g., a cell, a pixel, a matrix, etc.) that includes one or more elements of the plurality of elements, and the one or more elements of the plurality of elements may include parameters (e.g., a measurement, a classification, a probability, a LIDAR intensity value, an attribute of a roadway, an RGB value, etc.) used to determine the one or more prediction scores. The one or more prediction scores include a value (e.g., an indicator, etc.) that can be used to predict (e.g., signal, etc.) a location of a road edge boundary of the roadway.

In some non-limiting embodiments or aspects, map generation system 102 determines one or more prediction scores by first identifying sensor data (e.g., LIDAR point cloud, camera imagery logs, etc.) associated with a particular region of a map (e.g., a cell, a submap, area, etc.). For example, map generation system 102 may obtain map data collected by autonomous vehicle 104 including sensor data (e.g., one or more wide angle cameras, LIDAR, RADAR, accelerometers, gyroscopes, etc.) for a cell (e.g., a 10 cm by 10 cm area of a map, a predetermined area of a map, etc.). As an example, map generation system 102 may obtain one or more elements of the plurality of elements associated with parameters (e.g., a plurality of LIDAR points, etc.) on the surface of the roadway, such as a measured height at a location associated with the one or more elements. For example, the one or more elements are associated with a plurality of locations within a cell.

In some non-limiting embodiments or aspects, map generation system 102 may determine a prediction score by determining a flatness signal (e.g., probability score, etc.) associated with any of the plurality of cells of a map. For example, map generation system 102 determines a flatness image that includes prediction scores (e.g., signals, etc.) for each cell of a plurality of cells determined in a map (e.g., a submap, etc.) in a geographic area. In some non-limiting embodiments or aspects, map generation system 102 determines the flatness image based on one or more LIDAR points (e.g., measurement data of the road surface, etc.) associated with a respective one or more cells (e.g., a first cell of the plurality of cells) by identifying a plurality of LIDAR points of the map data that are associated with the area of a cell.

In some non-limiting embodiments or aspects, map generation system 102 determines a surface normal (e.g., a ground normal, etc.) by projecting any LIDAR points of the plurality of LIDAR points in the area of the cell on (e.g., onto) a surface normal vector. In some examples, the projections are limited to those characterized as having projections with a minimal variance. The surface normal vector may be limited to those vectors that are unique up to an inversion, including a distribution of LIDAR points (e.g., in 2D on the road, etc.) that define a unique vector (e.g., based on LIDAR points having a uniform distribution, or close to a uniform distribution). In some examples, an autonomous vehicle 104 or other collection vehicle must be in motion (e.g., traversing a roadway, not stationary, etc.) when collecting the map data. In a further example, an optimization function (e.g., argmin, argmax, etc.) can be used to determine a singular vector, such as, the singular vector corresponding to the smallest singular value of a variance in (e.g., within) a cell.

In some non-limiting embodiments or aspects, map generation system 102 determines a flatness variance image (e.g., a roughness image) that provides a flatness signal for determining a variance along a surface normal (e.g. a surface normal within the same cell used to calculate the surface normal, etc.). As an example, a flatness signal (e.g., a roughness signal, etc.) provides a prediction score associated with a flatness of each cell (e.g., a variance in the measurements of a cell, etc.), such as the variance along the surface normal of a cell (e.g., the smallest singular value, the largest singular value, etc.). In some non-limiting embodiments or aspects, a flatness signal may be determined in a cell including an area having a curb surface (e.g., a surface that is perpendicular or close to perpendicular to the ground, etc.), some parts of a sidewalk, and/or a surface of a roadway (e.g., a drivable surface, etc.). For example, in some non-limiting embodiments or aspects, map generation system 102 may determine prediction scores based on an area sized to include a curb and a sidewalk, a drivable surface, or any combination thereof.

In some non-limiting embodiments or aspects, map generation system 102 determines a flatness angle image that provides a flatness signal for determining a variance along a surface normal. For example, map generation system 102 determines a flatness angle image by determining an angle of the surface, where the angle of the surface is the difference between a surface normal of the cell and an average vector (e.g., a vector which represents an average of a plurality of surface normal vectors of a plurality of cells of a map, an average map or submap vector, an average map angle, etc.). Map generation system 102 may determine that an average vector of the surface normal is relevant based on a threshold number of areas having a majority of surface area (e.g., non-road edges, etc.) as opposed to areas having a road edge. A relevant average of the surface normal vectors (e.g., an average map vector) can represent the normal of the road edge of the entire map. In some non-limiting embodiments or aspects, map generation system 102 generates a flatness signal by generating a plurality of surface normals pointing in a particular direction (e.g., a same direction, pointing up, pointing down, etc.). In some non-limiting embodiments or aspects, map generation system 102 generates the surface normals between 0 and 90 degrees.

In some non-limiting embodiments or aspects, map generation system 102 generates an average vector (e.g., a unit vector, etc.) by optimizing an objective for computing the mean vector as defined in Equation (1):

$$\operatorname*{argmax}_{\bar{v}} \ (X\bar{v})^T X\bar{v}$$
$$\text{subject to} \quad \bar{v}^T \bar{v} = 1$$

Where X is the collection of a plurality of surface normal vectors in a plurality of cells.

In some non-limiting embodiments or aspects, a Lagrange multiplier is used to solve the optimization problem, as defined in Equation (2):

$$\operatorname*{argmax}_{\bar{v}} \mathcal{L}(\bar{v}, \lambda) = \operatorname*{argmax}_{\bar{v}} (X\bar{v})^T X\bar{v} - \lambda(\bar{v}^T \bar{v} - 1)$$

In some non-limiting embodiments or aspects, the above function is optimized to determine an equivalent of the maximum eigenvalue of matrix $X^T X$, to find any surface normal vector that points roughly upward (e.g., positive z-value, etc.). Map generation system 102 may determine the flatness image based on a square cell or a circle cell without adjusting the size of the cell. Additionally, a value of any element has a physical upper boundary. In some non-limiting embodiments or aspects, multiple reference vectors may be needed when one vector does not provide coverage for an entire map. As an example, map generation system 102 may determine an entrance and/or an exit of a bridge (e.g. a street bridge, a road bridge, etc.) provides a straight road coupled to an inclined ramp, such that the entrance provides a knee (e.g., a joint, etc.) between a flat surface of a straight road and an inclined surface of an inclined ramp to get to and/or from the bridge. In such an example, there can be no single plane which can represent an entire road edge of a map.

In some non-limiting embodiments or aspects, map generation system 102 outputs a flatness image (e.g., stores the flatness image in a map database, generates a map layer including one or more flatness images, generates map data including one or more flatness signals associated with a flatness image, generates multiple map layers to include multiple flatness signals, provides one or more flatness signals to autonomous vehicle 104, etc.). In some non-limiting embodiments or aspects, map generation system 102 provides one or more flatness images to a model to determine a road edge boundary. In some non-limiting embodiments or aspects, map generation system 102 outputs one or more surface normal vectors (e.g., stores one or more surface normal vectors in a map database, generates a map (e.g., map layer) having one or more surface normal vectors, provides or more surface normal vectors to autonomous vehicle 104, provide ones or more surface normal vectors to a model, etc.). For example, map generation system 102 may provide one or more surface normal vectors to a model as one or more inputs, such as, for example, an x-value, a y-value, and/or a z-value, and/or any combination thereof. In some non-limiting embodiments or aspects, map generation system 102 provides one or more flatness signals to a human operator to identify a road edge boundary in a map production system.

In some non-limiting embodiments or aspects, map generation system 102 generates a flatness image map providing a first indicator (e.g., a color, a pattern, etc.) for identifying regions where a surface normal is flat relative to the average map angle (e.g., on a road or sidewalk surface, etc.) and a second indicator for identifying where the angle of the surface normal is at a large angle (e.g., a curb edge, embankment, etc.).

In some non-limiting embodiments or aspects, map generation system 102 determines a first indicator that identifies a cell with a small surface variation in a flatness variance image (e.g., a small surface roughness, etc.). For example, map generation system 102 provides a first indicator in a flatness variance image in areas where a surface is at an angle, but is also smooth, such as in an area of a speed bump. In another example, map generation system 102 provides a second indicator in a flatness variance image in areas where a ground surface jumps in elevation (e.g., is inconsistent across points in the area, etc.).

In some non-limiting embodiments or aspects, map generation system 102 determines the one or more prediction scores associated with a road edge boundary of the roadway in the map using a machine learning technique (e.g., an encoder-decoder technique, a pattern recognition technique, a data mining technique, a heuristic technique, a supervised learning technique, an unsupervised learning technique, etc.). The prediction score of a road edge boundary classification may include a prediction score (e.g., a score, an indicator, a number, a ranking, etc.) of the likelihood that an element of the matrix of the image includes a road edge boundary classification of a road of the roadway. As an example, map generation system 102 generates a model (e.g., an estimator, a classifier, a prediction model, etc.) based on a machine learning algorithm (e.g., a decision tree algorithm, a gradient boosted decision tree algorithm, a neural network algorithm, a convolutional neural network algorithm, etc.). For example, map generation system 102 generates a model based on a LinkNet style architecture, with a baseline architecture constructed from a pretrained backbone (e.g., an encoder block using a pretrained encoder backbone such as a ResNet, an Inception model, etc.) as described by Chaurasia, A., and Eugenio, C., in "LinkNet: Exploiting Encoder Representations for Efficient Semantic Segmentation", (In arXiv:1707.03718v1 [cs.CV], 2017), the entire contents of which is hereby incorporated by reference). For example, a pretrained network may be used to generate a road edge boundary prediction score in areas that lack ground truth (e.g., road edge boundaries labeled to a curb). In some non-limiting embodiments or aspects, models can be used with ground truth labeled within 10-20 cm from the curb.

In some non-limiting embodiments or aspects, map generation system 102 determines the one or more prediction scores based on input of one or more inputs into the model (e.g., one or more flatness images, one or more surface normal vectors, one or more probability maps, one or more ground camera images, one or more LIDAR intensity images, etc.). Generation of road edge boundaries for a given set of images may use pattern detection on input evidence layers, such as the flatness and the pixel-wise probability as input evidence layers. For example, the model may be adjusted to use one or more of the evidence layers (e.g., configured to use all available evidence layers, etc.).

In some non-limiting embodiments or aspects, map generation system 102 generates a model (e.g., a road edge boundary classification model, a road edge boundary classification prediction model, etc.) based on image data associated with an image of a road. In some implementations, the model is designed to receive, as an input, image data associated with one or more images of a road that includes a lane and provide, as an output, an indication (e.g., a marking, a prediction, a probability, a binary output, a yes-no output, a score, a prediction, a prediction score, a road edge boundary classification prediction score, etc.) of a road edge boundary classification of the lane of the road. In one example, the model is designed to receive image data associated with an image of a road, and provide an output that indicates a road edge boundary classification of a lane of the road in which a vehicle (e.g., autonomous vehicle 104) may travel. In some examples, map generation system 102 stores the model (e.g., stores the model for later use). In some non-limiting embodiments or aspects, map generation system 102 stores the model in a data structure (e.g., a database, a linked list, a tree, etc.). In some examples, the data structure is located within map generation system 102 or external (e.g., remote from) map generation system 102.

In some non-limiting embodiments or aspects, map generation system 102 determines one or more prediction scores of a road edge boundary of the road using the model. In some non-limiting embodiments, map generation system 102 determines the road edge boundary classification associated with an element of a matrix of an image (e.g., an image of a map) that includes a lane of a road. For example, map generation system 102 determines a road edge boundary classification associated with the element of the matrix of the image using a model.

In some non-limiting embodiments or aspects, map generation system 102 may provide a mask of a ground truth line. For example, map generation system 102 may provide a threshold distance used to define a mask, such as setting a large value of the threshold to generate thick outputs or setting a thin value of the threshold to generate a precise boundary. In some examples, map generation system 102 may generate a border based on a large threshold to account for small variations between ground truth labels and a location of the predicted boundaries.

In some non-limiting embodiments or aspects, map generation system 102 may perform a pixel-wise regression of the model output. For example, map generation system 102 may generate an output from the model that can be used with a defined regression equation. In some non-limiting embodiments or aspects, the output of the network may include a single channel which may be further input to a sigmoid.

For example, map generation system 102 may perform a regression (e.g., generate an output) for a point $x_i$ as defined according to the following Equation (3):

$$\delta\left(1 - \min_j \frac{|x_i - l_j|}{\tau}\right)$$

In Equation (3), a threshold distance $\tau$ is computed over all points $l_j$ on a ground truth line, and $\delta$ represents the rectified linear unit (ReLU) operation. For example, Equation (3) may produce a signal which is 1 exactly on the ground truth polyline, which falls off linearly as a function of distance to the ground truth line down to 0 for points at a distance $>\tau$ from the ground truth line. As an example, map generation system 102 may use Equation (3) to balance sharp outputs from the model around a road edge boundary where a peak prediction score is generated at the desired location, while also providing a resilient prediction score with respect to expected variation in the labeled position of the road edge boundary about a "true" boundary location and/or providing resiliency to facilitate training non-trivial models that can classify all other points as non-boundary (e.g., points outside the road edge boundary, etc.). This may have a further effect of making the outputs from the model visually interpretable.

In some non-limiting embodiments or aspects, the model receives a plurality of input channels (e.g., images covering a same region of space, etc.) for determining a prediction score in the plurality of elements. For example, any of the plurality of input channels are aligned to a same bounding box (e.g., aligned to a same region of space and same pixel pitch, etc.). In some non-limiting embodiments or aspects, a ground truth heatmap is generated and obtained on the same bounding box computed for the evidence layers. For example, one or more ground truth polylines are computed by determining an annotated road and intersection polygon. A ground truth road edge boundary may include a left and right boundary with respect to a vehicle pose of a starting location, an intersection, and/or the like.

In some non-limiting embodiments or aspects, map images are augmented during training by rotating and flipping images using bilinear subsampling to perform arbitrary rotations. In some non-limiting embodiments or aspects, map generation system 102 may use a model to generate or augment a map layer with generated polylines.

In some non-limiting embodiments or aspects, map generation system 102 generates prediction scores in a map layer including a heatmap associated with a road edge in proximity to and/or within the roadway of the geographic area. In some non-limiting embodiments or aspects, map generation system 102 uses an output from the model to provide a dense heatmap including the prediction scores over which road edge boundary polylines can be generated. For example, a map layer may include a heatmap associated with a roadway (e.g., a heatmap of elements associated at a distance or location from an edge of a road, a heatmap of elements within and/or outside of an edge of a road, etc.), a heatmap of a roadway of a road (e.g., a heatmap of a road edge of a roadway of a road, a heatmap of a travel lane of a roadway, a histogram of a road edge of a roadway, etc.), a heatmap of a sidewalk of a road, and/or the like. In some non-limiting embodiments or aspects, a heatmap associated with a road edge and/or another object in proximity to and/or within a roadway may indicate a probability mass concentrated around the road edge or the other object.

In some non-limiting embodiments or aspects, a map layer may include a heatmap of an intensity of a color (e.g., red, green, blue, black, white, etc.) associated with one or more prediction scores in the image of the geographic location. In some non-limiting embodiments or aspects, map generation system 102 generates the heatmap having an intensity of the color associated with a homogenous area of a road edge boundary of a geographic location based on a road edge boundary. For example, map generation system 102 may generate a heatmap for a flatness image in the geographic location based on the intensity of the color being the same in the portion of the geographic location that includes the road edge boundary, an intensity of a second color being the same in the portion of the travel lane, an intensity of a third color being the same in the portion of the non-drivable surface.

As shown in FIG. 4, at step 406, process 400 includes generating in the map a road edge boundary for an edge of a road of the roadway based on the one or more prediction scores. For example, map generation system 102 generates in the map a road edge boundary for an edge of a road of the roadway based on the one or more prediction scores.

In some non-limiting embodiments or aspects, map generation system 102 generates a region in at least one map area in a location of the at least one roadway including a road edge boundary based on one or more prediction scores of the at least one map area. For example, map generation system 102 generates and/or provides one or more road edge boundary map layers based on identifying a road edge boundary. In some examples, a road edge boundary map layer may be used by autonomous vehicle 104 to identify a road edge boundary (e.g., during autonomous operation, during manual operation, etc.). In some non-limiting embodiments or aspects, map generation system 102 may generate or provide a road edge boundary map layer that includes crosswalks having an inclined curb (e.g., a handicap crosswalk, etc.), road edge boundaries along a roadway with parked cars, road edge boundaries having no curb and/or a less defined curb area (e.g., a highway, a bridge, a country road, etc.). In some non-limiting embodiments or aspects, map generation system 102 determines non-drivable surface boundaries. For example, map generation system 102 determines a road edge boundary by determining a non-drivable surface (e.g., sidewalks, embankments, dividers, a median, a traffic barrier, etc.).

In some non-limiting embodiments or aspects, map generation system 102 generates and/or provides the road edge boundary of the at least one map area as a selectable factor for indicating a location where a road edge boundary is located in a map of the geographic location.

In some non-limiting embodiments or aspects, map generation system 102 includes verifying the at least one map area associated with a road edge boundary. For example, map generation system 102 generates and/or provides one or more road edge boundary map layers after verifying a road edge boundary. In some non-limiting embodiments or aspects, a map generation system 102 generates a road edge boundary map layer after a specialist verifies a road edge boundary in a map production program.

In some non-limiting embodiments or aspects, map generation system 102 may output map data to autonomous vehicle 104 which includes one or more road edge boundaries in a geographical location. As an example, map generation system 102 and/or autonomous vehicle 104 may receive and/or determine a probability score associated with an element of a road edge boundary to determine a motion path. In some non-limiting embodiments or aspects, map generation system 102 and/or autonomous vehicle 104 determines that an element of the map includes a road edge boundary based on the probability score associated with an element of a map satisfying the threshold value.

In some non-limiting embodiments or aspects, map generation system 102 outputs (e.g., automatically) the map data to autonomous vehicle 104 based on generating the one or more road edge boundaries, AV maps, and/or the like. In some non-limiting embodiments or aspects, autonomous vehicle 104 autonomously traverses a roadway based on the prediction scores associated with a location of a road edge boundary. Further details regarding non-limiting embodiments of step 406 of process 400 are provided below with regard to FIG. 5.

Figure 5:
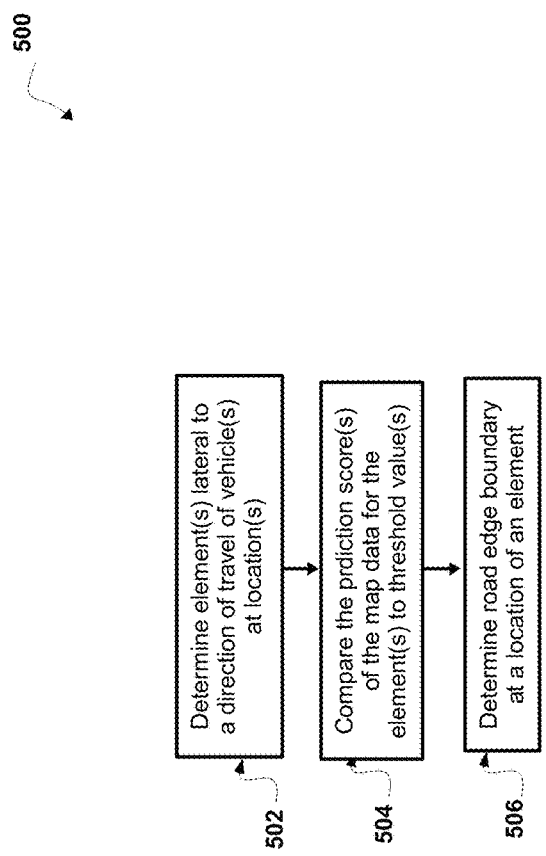
FIG. 5 is a flowchart of non-limiting embodiments or aspects of a process for determining a road edge boundary.

Referring now to FIG. 5, FIG. 5 is a flowchart of a non-limiting embodiment or aspect of a process 500 for determining a road edge boundary. In some non-limiting embodiments or aspects, one or more of the steps of process 500 are performed (e.g., completely, partially, etc.) by map generation system 102 (e.g., one or more devices of map generation system 102, etc.). In some non-limiting embodiments or aspects, one or more of the steps of process 500 are performed (e.g., completely, partially, etc.) by another device or a group of devices separate from or including map generation system 102, such as one or more devices of (e.g., one or more devices of a system of) autonomous vehicle 104.

As shown in FIG. 5, at step 502, process 500 includes determining elements that are lateral to a direction of travel of the one or more vehicles at the one or more locations. For example, map generation system 102 determines one or more elements of the plurality of elements that are lateral to a direction of travel of the one or more vehicles (e.g. a collection car, a mapping vehicle, etc.) at the one or more locations. As an example, map generation system 102 determines the one or more elements in a ray extending outward from a vehicle lateral to a direction of travel (e.g., to a side, perpendicular to a vehicle pose, etc.) of the vehicle at any location of the one or more locations. In some examples, map generation system 102 determines the one or more elements lateral to the vehicle by determining a ray (e.g., a lateral ray, etc.) originating from a vehicle pose of the one or more vehicles at a location of the one or more locations in the map (e.g., a ray associated with one or more elements of the plurality of elements, etc.) that extends through one or more elements of the plurality of elements. The one or more elements lateral to the vehicle may include a prediction score associated with whether the one or more elements are a road edge boundary.

In some non-limiting embodiments or aspects, map generation system 502 determines the one or more locations based on one or more vehicle poses of one or more vehicles that collect map data and/or sensor data on a mapping route. As an example, map generation system 102 obtains the vehicle pose data of autonomous vehicles and/or non-autonomous vehicles associated with one or more vehicle poses of the vehicles for the one or more locations in a geographic region. For example, map generation system 102 may store one or more vehicle poses received from a vehicle log (e.g., a vehicle pose and the sensor data, such that the vehicle pose may be coupled to the sensor data, etc.).

In some non-limiting embodiments or aspects, map generation system 502 obtains the prediction score for any of the one or more elements for determining whether an element is a road edge boundary.

As shown in FIG. 5, at step 504, process 500 includes comparing the prediction scores of the map data for the elements to threshold values. As an example, map generation system 102 compares the one or more prediction scores of the map data for the one or more elements to one or more threshold values. For example, map generation system 102 determines one or more prediction scores based on the comparison of the one or more prediction scores of the map data for the one or more elements to one or more threshold values. For example, map generation system 102 determines one or more prediction scores based on the flatness image to determine the location of a road edge boundary and/or a drivable surface. In some non-limiting embodiments or aspects, map generation system 102 determines a drivable surface to determine a road edge boundary over which a vehicle should not travel.

In some non-limiting embodiments or aspects, map generation system 102 obtains the prediction score for any of the one or more elements for determining whether any element of the one or more elements is a road edge boundary. For example, the one or more elements lateral to the vehicle include a prediction score associated with whether a road edge boundary is found at a location associated with that element.

In some non-limiting embodiments or aspects, map generation system 102 may search for a first element of the road edge boundary for the vehicle pose and select a first point in the one or more points of the lateral ray at which a prediction score exceeds a given threshold. For example, map generation system 102 compares any determined prediction score of the one or more elements to a threshold value.

In some non-limiting embodiments or aspects, an element with a largest overall prediction score along a lateral ray may not be used, as this element may be an element of a wall or some other obstruction that is located behind a road edge boundary (e.g., outside the drivable surface and past a road edge boundary, etc.). For example, selecting a first point is based on selecting an element exceeding a threshold value but not having a highest score in the lateral ray (e.g., a score greater than a prediction score of any of another of the one or more elements of the lateral ray, etc.). In some non-limiting embodiments or aspects, the first high scoring region corresponds to a drivable surface boundary. In a geographical location having speed bumps, roadway objects, or other deformations in the road surface, this may not be the case. In some non-limiting embodiments or aspects, additional filtering steps may be used to remove such prediction scores or locations to account for such conditions. As an example, map generation system 102 may erase (e.g., associate a zero value, etc.) any element (e.g., any prediction score associated with any element, etc.) within a given range (e.g., a radius) of a vehicle pose (e.g., a pose of a vehicle during map data collection, etc.) in a map (e.g., a heatmap, etc.) before determining the one or more elements (e.g., the one or more elements of the lateral ray, etc.) to eliminate elements that are closer to the vehicle than the road edge.

In some non-limiting embodiments or aspects, map generation system 102 generates or finds a road edge boundary by determining an element in a region of the first point having a highest prediction score. For example, map generation system 102 determines a first element satisfying a threshold and then determines a second element within a region of the first element that has a higher prediction score than the first element. For example, map generation system 102 compares a prediction score of an element within a cell of the first element (e.g., a predetermined area, within a range of the element, etc.) to any other prediction score within the cell to determine an element of the cell with a highest prediction score.

As shown in FIG. 5, at step 506, process 500 includes determining a road edge boundary at a location of an element. As an example, map generation system 102 determines a road edge boundary at a location of an element of the one or more elements based on the comparison.

In some non-limiting embodiments or aspects, map generation system 102 identifies one or more polylines of a road edge boundary in the geographic location based on the prediction scores associated with locations and/or the elements of the one or more polylines. For example, map generation system 102 generates one or more polylines representing a drivable surface or a road edge boundary starting from an element of the plurality of elements with a highest prediction score (e.g., a highest prediction score in a cell of a plurality of cells, etc.). In some non-limiting embodiments or aspects, map generation system 102 generates a polyline by determining and connecting one or more elements (e.g., one or more locations of one or more elements, etc.) together to a neighboring element (e.g., a nearest neighbor not already in a polyline, etc.). In some non-limiting embodiments or aspects, map generation system 102 may determine and connect an element based on a larger prediction score to break a tie between two or more nearest neighboring elements when connecting the one or more elements. In some non-limiting embodiments or aspects, map generation system 102 connects one or more elements until there is no point within a distance (e.g., a predetermined distance, etc.) of the point under consideration.

In some non-limiting embodiments or aspects, map generation system 102 determines a lateral ray of elements on a left side and right side of a vehicle pose (e.g., a polyline traveling out in both directions from a starting point, etc.). For example, map generation system 102 determines one or more elements from a starting element twice from the same starting point (e.g., once for each lateral side, etc.). After a polyline is created, the one or more elements are removed from consideration until all elements have been exhausted.

In some non-limiting embodiments or aspects, map generation system 102 determines a plurality of road edge polylines based on the prediction scores. In some non-limiting embodiments or aspects, map generation system 102 filters polylines including the one or more locations of the road edge boundary to satisfy a threshold length.

In some non-limiting embodiments or aspects, map generation system 102 filters a plurality of road edge polylines based on the prediction scores. In some examples, map generation system 102 filters a first road edge polyline generated incorrectly (e.g., a short polyline, a polyline based on a noisy input signal in the roadway, a polyline generated from points beyond the road boundary, etc.). For example, map generation system 102 performs filtering to remove polylines below a length threshold. In some non-limiting embodiments or aspects, map generation system 102 performs a smoothing and/or resampling step to smooth these points to the final polyline.

In some non-limiting embodiments or aspects, map generation system 102 generates a road edge boundary of the roadway in the map based on the plurality of prediction scores and/or polylines. As an example, map generation system 102 outputs and/or writes the polylines into a map. In some non-limiting embodiments or aspects, map generation system 102 determines map data associated with a road edge boundary in the roadway (e.g., map data including an image, a map, and/or features including a ground truth representing the road edge boundary therein, etc.).

Referring now to FIGS. 6A-6D, FIGS. 6A-6D are diagrams of an overview of a non-limiting embodiment of an implementation 600 relating to one or more processes disclosed herein. As shown in FIGS. 6A-6D, implementation 600 includes map generation system 602 and autonomous vehicle 604, including vehicle computing system 606. In some non-limiting embodiments or aspects, map generation system 602 can be the same or similar to map generation system 102. In some non-limiting embodiments or aspects, autonomous vehicle 604 can be the same or similar to autonomous vehicle 104. In some non-limiting embodiments or aspects, vehicle computing system 606 can be the same or similar to vehicle computing system 106.

Figure 6A:
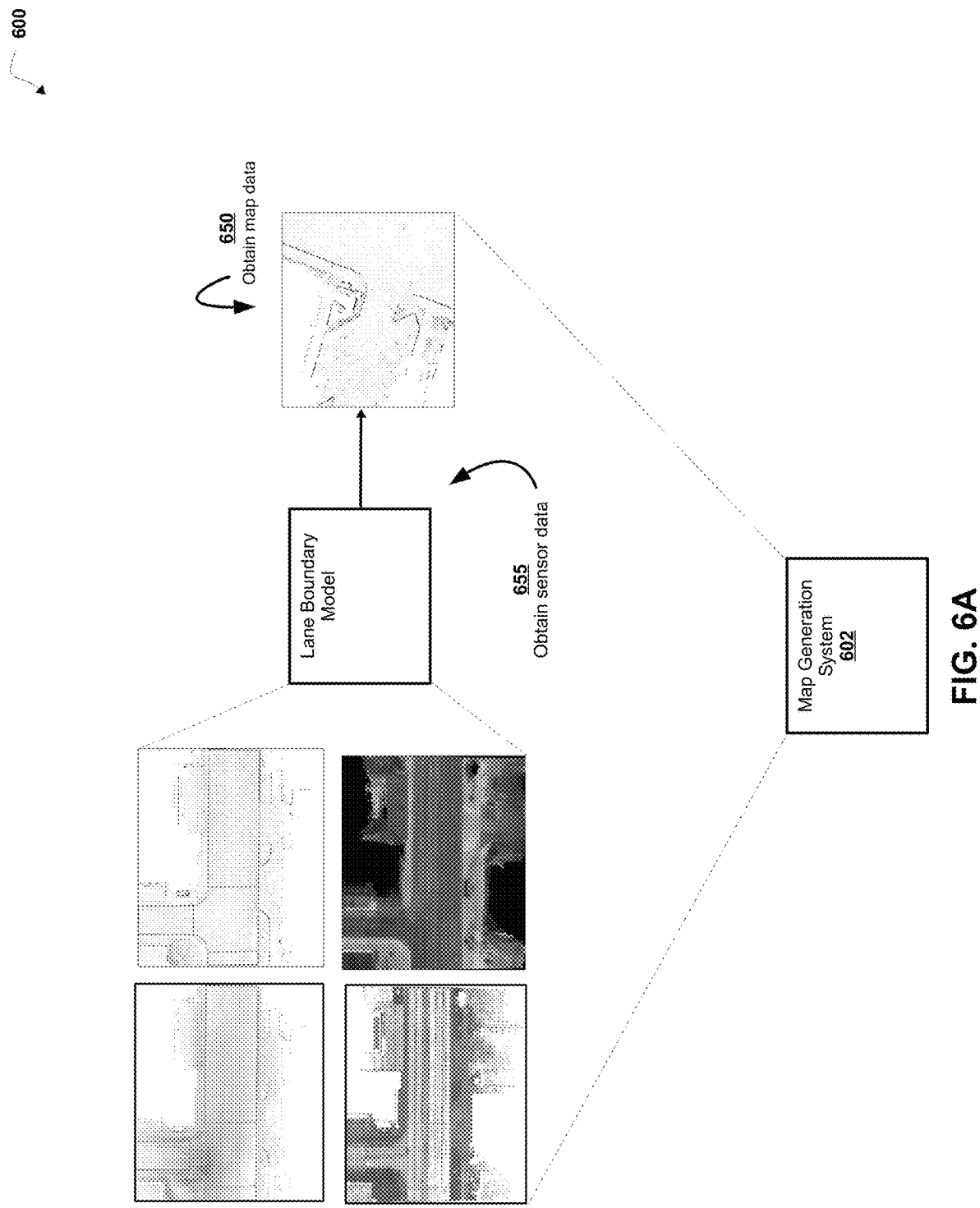

As shown by reference number 650 in FIG. 6A, map generation system 602 obtains map data. As shown by reference number 655 in FIG. 6A, map generation system 602 obtains sensor data based on one or more inputs to a model (e.g., a neural network, etc.).

Figure 6B:

As shown by reference number 660 in FIG. 6B, map generation system 602 determines one or more locations of a vehicle pose of a vehicle that collects map data and/or sensor data on a mapping route. As an example, map generation system 602 obtains vehicle pose data of autonomous vehicles and/or non-autonomous, human controlled vehicles associated with one or more vehicle poses of the vehicles as they traverse a roadway through one or more locations in a geographic region. For example, the vehicle pose may be associated with sensor data collected by one or more vehicles (e.g., map collection vehicle, etc.) during traversal collection of data for mapping and/or during normal (e.g., non-mapping specific, etc.) autonomy operations. As an example, when vehicles travel in the world, sensor(s) 210 can log sensor data (e.g., LIDAR point clouds, video logs from the cameras, etc.) and vehicle pose data in vehicle logs, and the sensor data and the pose data can be stored by map generation system 602 such that the vehicle pose may be coupled to the sensor data.

Figure 6C:
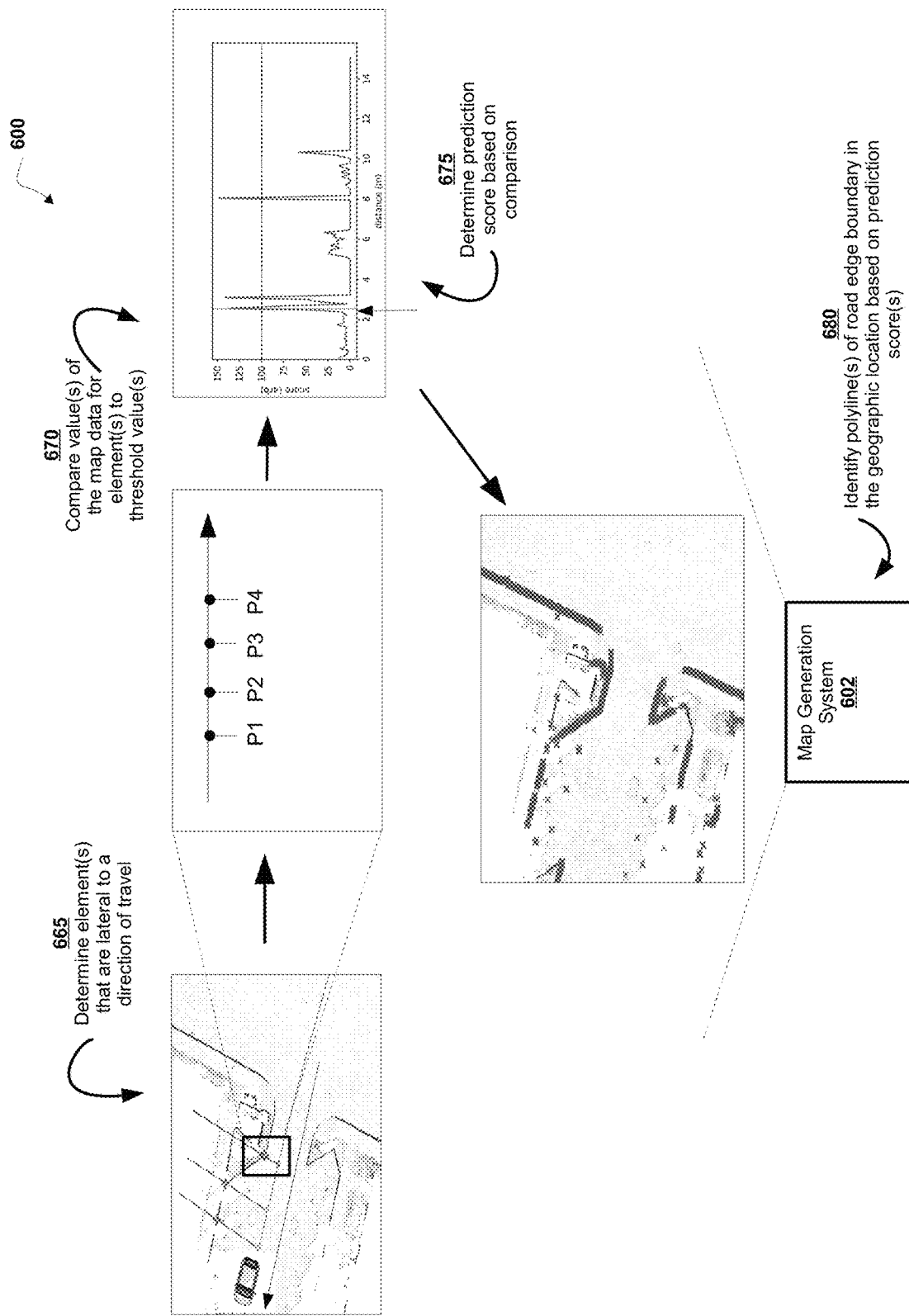

As shown by reference number 665 in FIG. 6C, map generation system 602 determines elements of a plurality of elements that are lateral to a direction of travel of the vehicle. For example, map generation system 602 determines the one or more elements extending laterally from the vehicle by determining a ray as shown, originating from a vehicle pose of the one or more vehicles at a location of the one or more locations in the map that extends through one or more elements of the plurality of elements.

In some non-limiting embodiments or aspects, map generation system 602 obtains the prediction score for any of the one or more elements for determining whether an element is a road edge boundary. The one or more elements lateral to the vehicle may include a prediction score associated with whether the one or more elements are a road edge boundary.

As shown by reference number 670 in FIG. 6C, map generation system 602 compares one or more values of the map data for the one or more elements to one or more threshold values.

As shown by reference number 675 in FIG. 6C, map generation system 602 determines one or more prediction scores based on the comparison of the one or more values of the map data for the one or more elements to one or more threshold values.

As shown by reference number 680 in FIG. 6C, map generation system 602 identifies one or more polylines of a road edge boundary in the geographic location based on the prediction scores associated with locations and/or the elements of the one or more polylines.

As shown by reference number 685 in FIG. 6D, map generation system 602 filters polylines including the one or more locations of the road edge boundary to satisfy a threshold length.

As shown by reference number 690 in FIG. 6D, map generation system 602 generates a road edge boundary of the roadway in the map based on the plurality of prediction scores.

As shown by reference number 695 in FIG. 6D, autonomous vehicle 604 transmits map data associated with a road edge boundary in the roadway (e.g., map data including an image, a map, and/or features including a ground truth representing the road edge boundary therein, etc.).

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
    obtaining, with a computing system comprising one or more processors, map data associated with a map of a geographic location including a roadway, and vehicle data comprising one or more locations of one or more vehicles in the roadway during one or more traversals of the roadway by the one or more vehicles, wherein the map data comprises a plurality of elements;
    determining one or more elements of the plurality of elements that are lateral to a direction of travel of the one or more vehicles at the one or more locations;
    determining, with the computing system, one or more prediction scores based on the map data, wherein the one or more prediction scores include one or more predictions of whether a second subset of elements of the plurality of elements include road edge boundary locations; and
    generating, with the computing system, in the map a road edge boundary for an edge of a road of the roadway based on the one or more prediction scores the generating of the road edge boundary comprising:
        comparing one or more pixel scores for the one or more elements to one or more threshold values; and
        determining a road edge boundary at a location of an element of the one or more elements based on the comparing.

2. The computer-implemented method of claim 1, wherein generating the road edge boundary comprises:
    connecting elements of the second subset of elements in a polyline based on the one or more prediction scores and distances between the elements of the second subset of elements in the map.

3. The computer-implemented method of claim 1, wherein the map data includes one or more images of the geographic location including the roadway, wherein the one or more images include one or more pixels corresponding to one or more elements of the plurality of elements of the map, and wherein the one or more pixels include at least one of the following parameters of the map data used to determine the one or more prediction scores: an angle, a LIDAR intensity value, a type of attribute of the roadway, an RGB value, or any combination thereof.

4. The computer-implemented method of claim 3, wherein the map data includes a plurality of different images of the geographic location including the roadway, and wherein the plurality of different images include two or more of: a flatness image, a rasterized camera image, a LIDAR image, a rasterized pixel-wise semantic segmentation image, or any combination thereof.

5. The computer-implemented method of claim 3, further comprising:
    obtaining, with the computing system, sensor data associated with one or more traversals of the roadway by the one or more vehicles; and
    generating, with the computing system, the one or more images based on the sensor data.

6. The computer-implemented method of claim 1, further comprising:
    providing, with the computing system, the road edge boundary for controlling travel of an autonomous vehicle on the roadway.

7. A computing system, comprising:
    one or more processors programmed and/or configured to:
        obtain map data associated with a map of a geographic location including a roadway, and vehicle data comprising one or more locations of one or more vehicles in the roadway during one or more traversals of the roadway by the one or more vehicles, wherein the map data comprises a plurality of elements;
        determine one or more elements of the plurality of elements that are lateral to a direction of travel of the one or more vehicles at the one or more locations;
        determine one or more prediction scores based on the map data, wherein the one or more prediction scores include one or more predictions of whether a second subset of elements of the plurality of elements include road edge boundary locations; and generate in the map a road edge boundary for an edge of a road of the roadway based on the one or more prediction scores the generating of the road edge boundary comprising:
   comparing one or more pixel scores for the one or more elements to one or more threshold values; and
determining a road edge boundary at a location of an element of the one or more elements based on the comparing.

8. The computing system of claim 7, wherein the one or more processors are configured to generate the road edge boundary by:
   connecting elements of the second subset of elements in a polyline based on the one or more prediction scores and distances between the elements of the second subset of elements in the map.

9. The computing system of claim 7, wherein the map data includes one or more images of the geographic location including the roadway, wherein the one or more images include one or more pixels corresponding to one or more elements of the plurality of elements of the map, and wherein the one or more pixels include at least one of the following parameters of the map data used to determine the one or more prediction scores: an angle, a LIDAR intensity value, a type of attribute of the roadway, an RGB value, or any combination thereof.

10. The computing system of claim 9, wherein the map data includes a plurality of different images of the geographic location including the roadway, and wherein the plurality of different images include two or more of: a flatness image, a rasterized camera image, a LIDAR image, a rasterized pixel-wise semantic segmentation image, or any combination thereof.

11. The computing system of claim 9, wherein the one or more processors are further configured to:
   obtain sensor data associated with one or more traversals of the roadway by the one or more vehicles; and
   generate the one or more images based on the sensor data.

12. The computing system of claim 7, wherein the one or more processors are further configured to:
   provide the road edge boundary for controlling travel of an autonomous vehicle on the roadway.

13. A computer program product comprising at least one non-transitory computer-readable medium including program instructions that, when executed by at least one processor, cause the at least one processor to:
   obtain map data associated with a map of a geographic location including a roadway, and vehicle data comprising one or more locations of one or more vehicles in the roadway during one or more traversals of the roadway by the one or more vehicles, wherein the map data comprises a plurality of elements;
   determine one or more elements of the plurality of elements that are lateral to a direction of travel of the one or more vehicles at the one or more locations;
   determine one or more prediction scores based on the map data, wherein the one or more prediction scores include one or more predictions of whether a second subset of elements of the plurality of elements include road edge boundary locations; and
   generate in the map a road edge boundary for an edge of a road of the roadway based on the one or more prediction scores the generating of the road edge boundary comprising:
      comparing one or more pixel scores for the one or more elements to one or more threshold values; and
   determining a road edge boundary at a location of an element of the one or more elements based on the comparing.

14. The computer program product of claim 13, wherein the one or more instructions further cause the at least one processor to generate the road edge boundary by:
   connecting elements of the second subset of elements in a polyline based on the one or more prediction scores and distances between the elements of the second subset of elements in the map.

15. The computer program product of claim 13, wherein the map data includes one or more images of the geographic location including the roadway, wherein the one or more images include one or more pixels corresponding to one or more elements of the plurality of elements of the map, and wherein the one or more pixels include at least one of the following parameters of the map data used to determine the one or more prediction scores: an angle, a LIDAR intensity value, a type of attribute of the roadway, an RGB value, or any combination thereof.

16. The computer program product of claim 15, wherein the map data includes a plurality of different images of the geographic location including the roadway, and wherein the plurality of different images include two or more of: a flatness image, a rasterized camera image, a LIDAR image, a rasterized pixel-wise semantic segmentation image, or any combination thereof.

17. The computer program product of claim 15, wherein the one or more instructions further cause the at least one processor to:
   obtain sensor data associated with one or more traversals of the roadway by the one or more vehicles; and
   generate the one or more images based on the sensor data.

* * * * *